(12) United States Patent
Zaitsev

(10) Patent No.: US 9,261,408 B2
(45) Date of Patent: Feb. 16, 2016

(54) BOLOMETRIC INFRARED QUADRANT DETECTORS AND USES WITH FIREARM APPLICATIONS

(71) Applicant: Sergey V. Zaitsev, Eden Prairie, MN (US)

(72) Inventor: Sergey V. Zaitsev, Eden Prairie, MN (US)

(73) Assignee: SVZ Technologies, LLC, Eden Prairie, MN (US)

( * ) Notice: Subject to any disclaimer, the term of this patent is extended or adjusted under 35 U.S.C. 154(b) by 0 days.

(21) Appl. No.: 14/577,849

(22) Filed: Dec. 19, 2014

(65) Prior Publication Data
US 2015/0176947 A1    Jun. 25, 2015

Related U.S. Application Data

(60) Provisional application No. 61/952,246, filed on Mar. 13, 2014, provisional application No. 61/919,982, filed on Dec. 23, 2013.

(51) Int. Cl.
*G01J 5/02*  (2006.01)
*F41G 3/16*  (2006.01)
*G01S 3/784*  (2006.01)

(52) U.S. Cl.
CPC . *G01J 5/027* (2013.01); *F41G 3/16* (2013.01); *G01S 3/784* (2013.01)

(58) Field of Classification Search
CPC ........... G01J 1/02; G01J 1/0266; F41G 7/008; F41G 7/2253; F41G 7/226; F41G 7/2293
See application file for complete search history.

(56) References Cited

U.S. PATENT DOCUMENTS 3,703,845 A    11/1972  Griew
3,911,275 A *  10/1975  Dumbaugh, Jr. ........... 250/338.1
(Continued)

FOREIGN PATENT DOCUMENTS

| GB | 1502611 A | * | 3/1978 |  |
| GB | 2445849 A | * | 7/2008 |  |
| JP | 60198419 A | * | 10/1985 | ................ G01J 1/42 |

OTHER PUBLICATIONS

ARS Technica.com, TrackingPoint aims to produce "super Gun" with 3,000-yard single shot accuracy, [online] Nov. 8, 2013, available at: http://arstechnica.com/gadgets/2013/07/trackingpoint-aims-to-produce-super-gun-with-3000-yard-single-shot-accuracy/, retrieved Mar. 30, 2015, 6 pages.

(Continued)

*Primary Examiner* — Kiho Kim
(74) *Attorney, Agent, or Firm* — Krenz Patent Law, LLC

(57) ABSTRACT

A thermal position sensor includes a collection of micro-bolometers, each having an electrical resistance and each including a substrate and an absorptive element. The absorptive element is suspended above the substrate and configured to absorb infrared radiation, including 10-micron long-wavelength infrared radiation. A change in a temperature of the micro-bolometer causes a change in the resistance of the micro-bolometer. The collection of micro-bolometers is partitioned into a first quadrant, a second quadrant, a third quadrant, and a fourth quadrant, where each of the quadrants represents a 90-degree segment of the sensor and includes at least one micro-bolometer of the collection of micro-bolometers. Each of the quadrants includes at least one output signal that provides information indicative of a temperature of the quadrant based on a resistance associated with the at least one micro-bolometer of the quadrant.

19 Claims, 28 Drawing Sheets

(56) References Cited

U.S. PATENT DOCUMENTS

| | | | | |
|---|---|---|---|---|
| 4,324,491 | A | * | 4/1982 | Hueber .................. 356/139.08 |
| 5,004,267 | A | * | 4/1991 | Busby ...................... 280/766.1 |
| 5,129,595 | A | | 7/1992 | Thiede et al. |
| 5,148,012 | A | * | 9/1992 | Carter ....................... 250/203.4 |
| 5,980,124 | A | | 11/1999 | Bernardi et al. |
| 6,465,785 | B1 | | 10/2002 | McManus |
| 6,583,416 | B1 | | 6/2003 | Villani |
| 6,871,439 | B1 | | 3/2005 | Edwards |
| 8,826,583 | B2 | | 9/2014 | Kepler et al. |
| 8,936,193 | B2 | | 1/2015 | McHale et al. |
| 2002/0166968 | A1 | * | 11/2002 | Bradley ...................... 250/338.1 |
| 2007/0094912 | A1 | * | 5/2007 | Bender ............................. 42/94 |
| 2008/0094473 | A1 | | 4/2008 | Rom |
| 2008/0272921 | A1 | | 11/2008 | Cole |
| 2009/0126250 | A1 | | 5/2009 | Keng |
| 2009/0306892 | A1 | | 12/2009 | Malka et al. |
| 2012/0019700 | A1 | | 1/2012 | Gaber |
| 2013/0082178 | A1 | | 4/2013 | Petraitis et al. |
| 2013/0284927 | A1 | | 10/2013 | Kryskowski |
| 2013/0286216 | A1 | | 10/2013 | Lupher et al. |
| 2013/0293952 | A1 | | 11/2013 | Brooker |
| 2013/0329211 | A1 | | 12/2013 | McHale et al. |
| 2014/0104618 | A1 | | 4/2014 | Potsaid et al. |
| 2014/0157646 | A1 | | 6/2014 | McHale et al. |
| 2014/0182187 | A1 | | 7/2014 | McHale |
| 2014/0184476 | A1 | | 7/2014 | McHale et al. |
| 2014/0184788 | A1 | | 7/2014 | McHale et al. |
| 2014/0188385 | A1 | | 7/2014 | McHale et al. |

OTHER PUBLICATIONS

ITL MARS, International Technologies Lasers Multi-purpose Aiming Reflex Sight, [online]. Dec. 2, 2007, available at: http://en.wikipedia.org/wiki/ITL_MARS, retrieved Feb. 10, 2015, 1 page.

Lee W., Young, Authorized officer, Form PCT/ISA/220, International Search Report for International Application No. PCT/US14/71997, mailed Mar. 18, 2015, 4 pages.

OSI, Sum and Difference Amplifier Modules, [online] Nov. 17, 2013, available at: http://www.osioptoelectronics.com/standard-products/silicon-photodiodes/position-sensing-detectors/sum-and-difference-amplifier-modules.aspx, retrieved Feb. 10, 2015, 4 pages.

TFB, the Future is Now: Tracking Point Precision Guided Firearms, [online], Feb. 22, 2013, available at: http://www.thefirearmblog.com/blog/2012/11/22/the-future-is-now-tracking-point-precision-guided-firearms/, retrieved Mar. 30, 2015, 5 pages.

\* cited by examiner

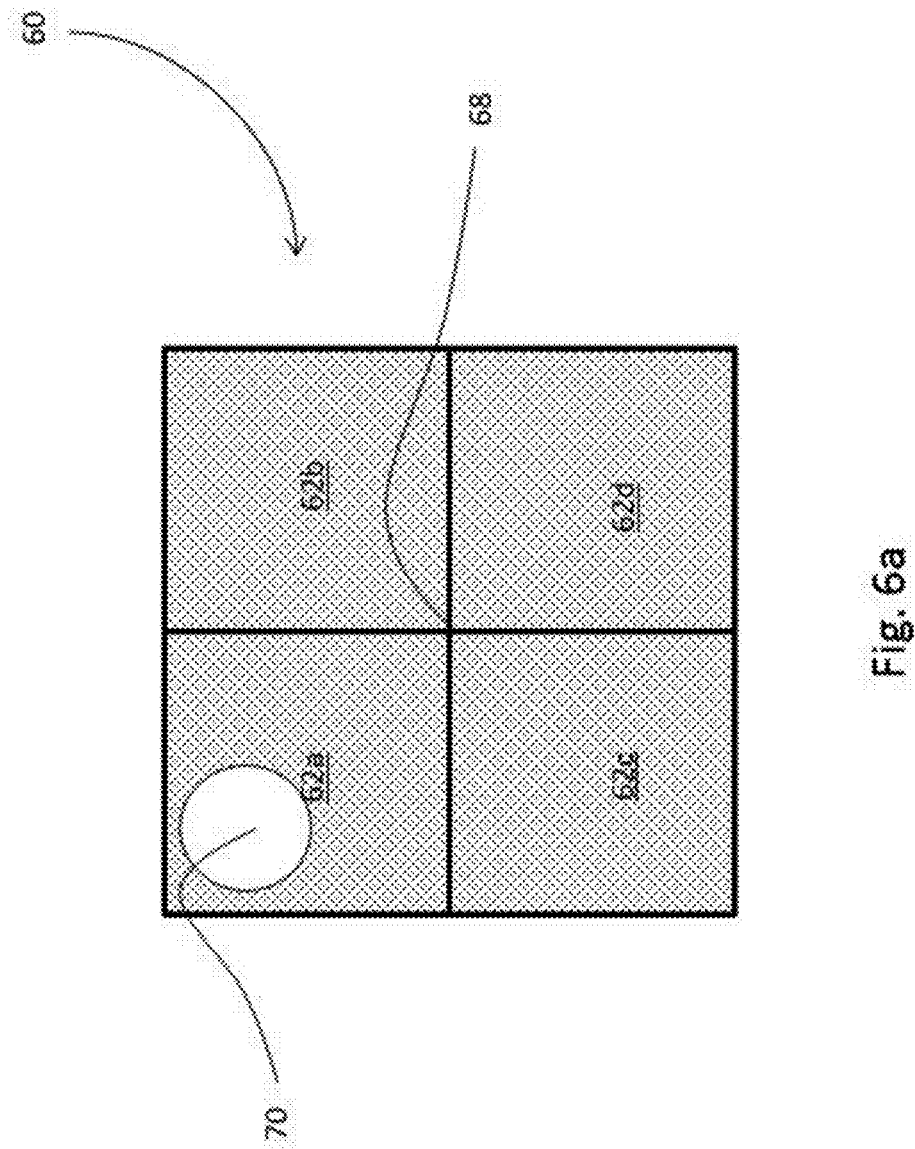

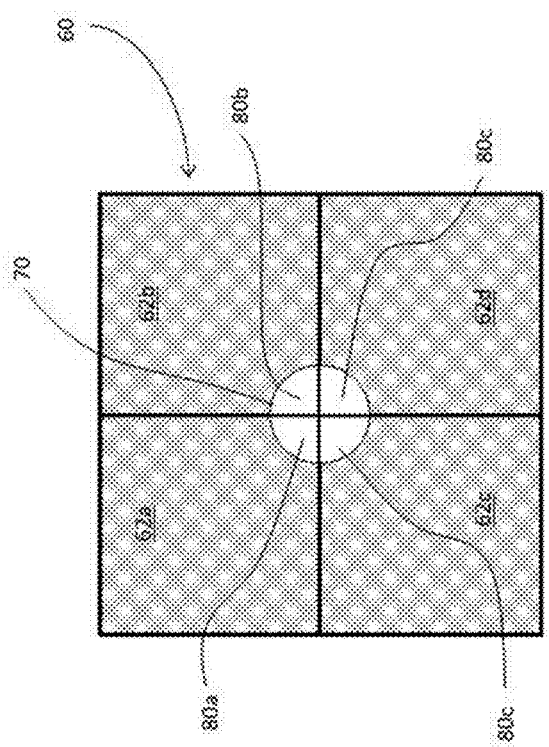

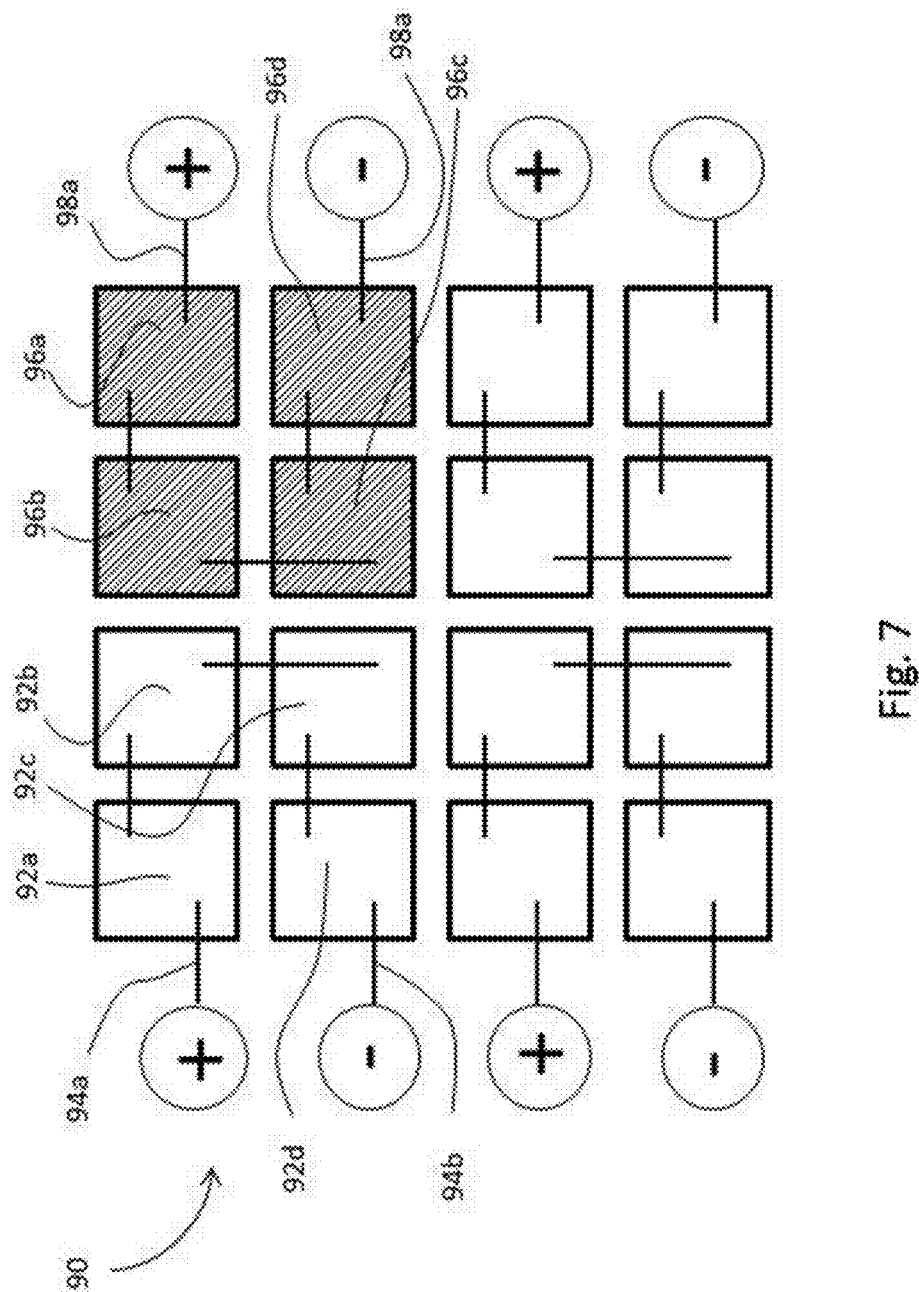

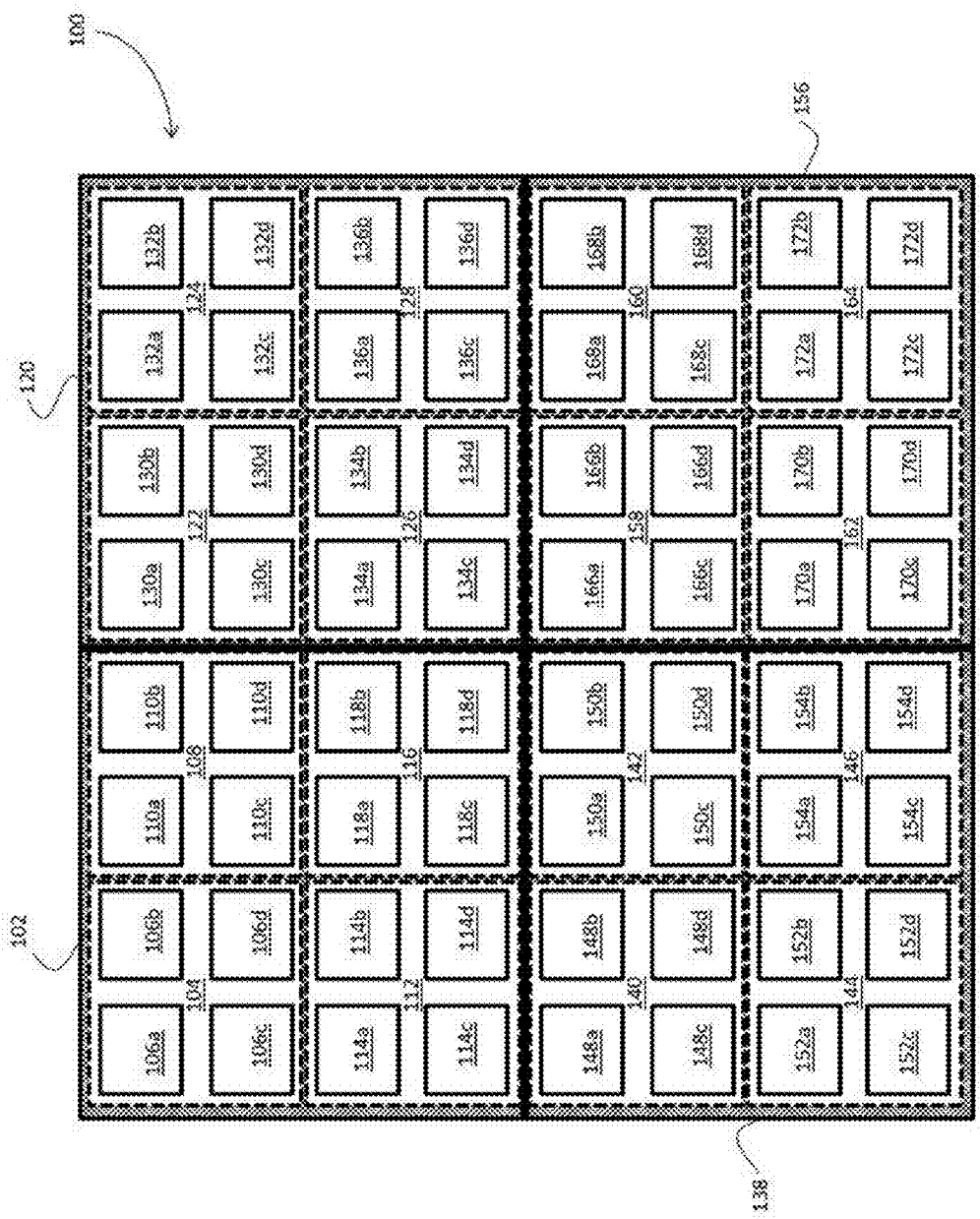

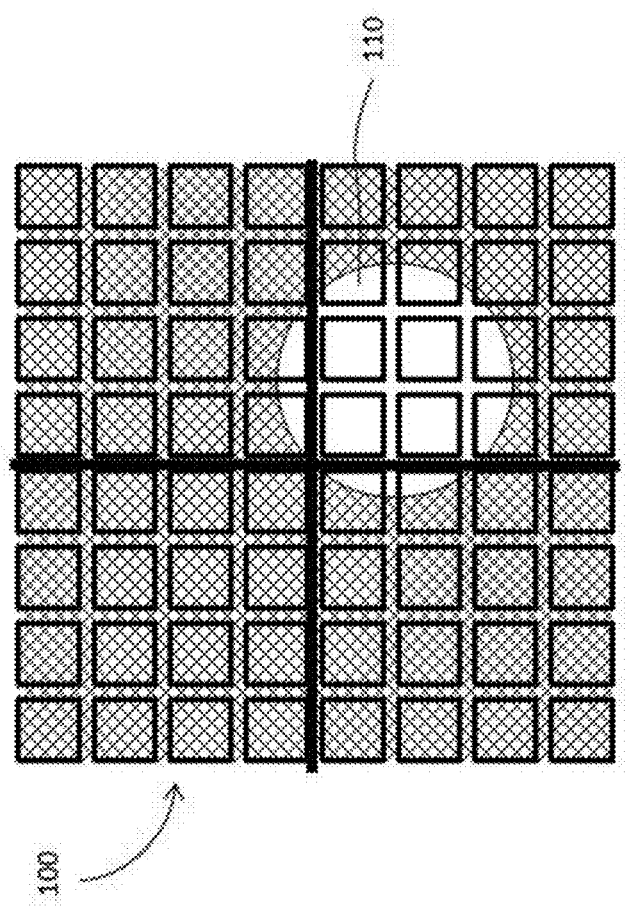

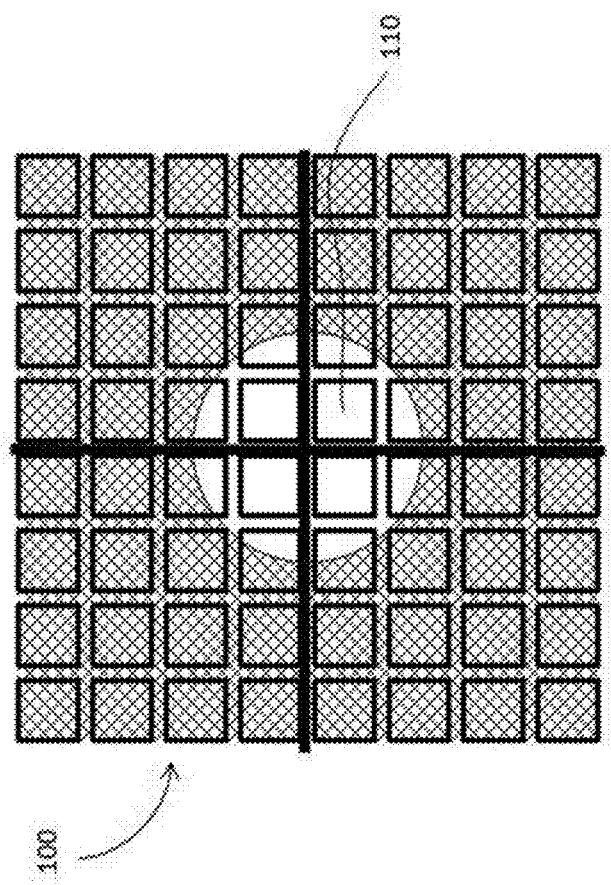

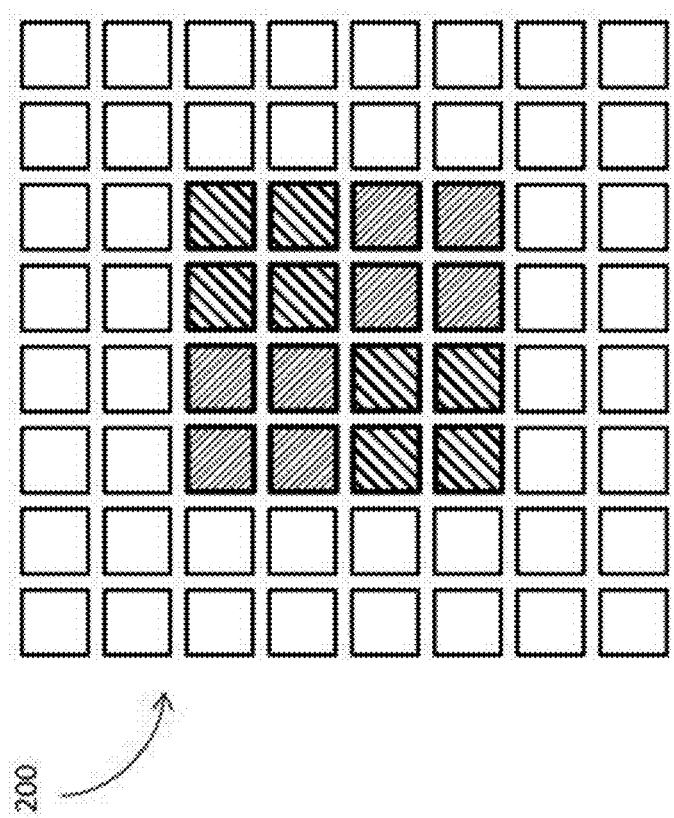

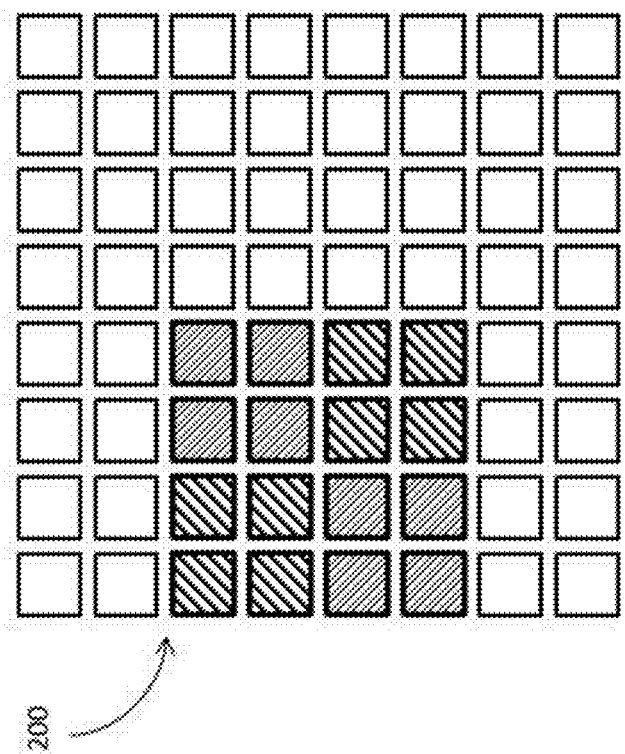

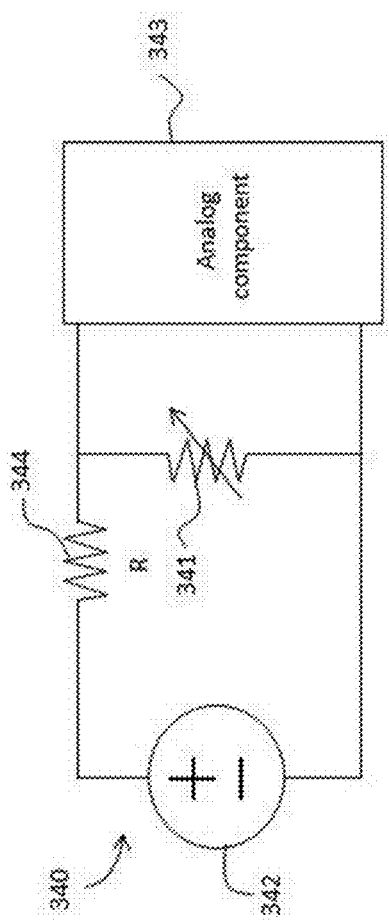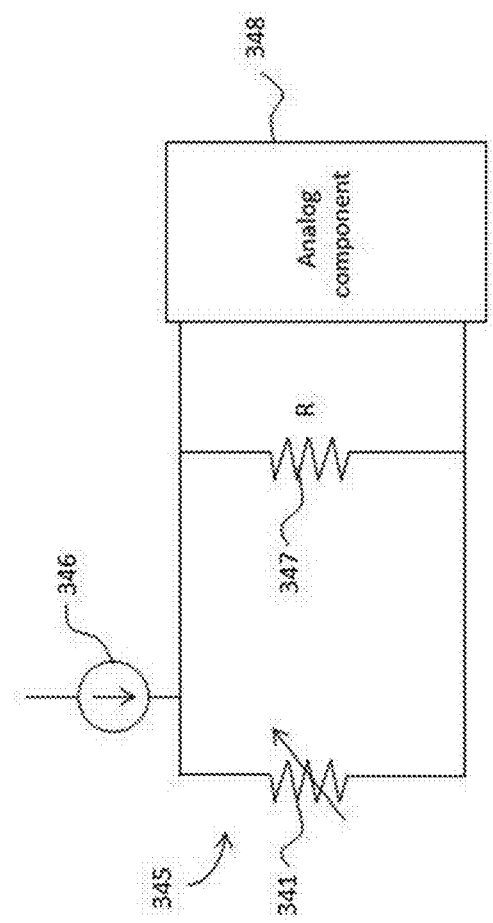

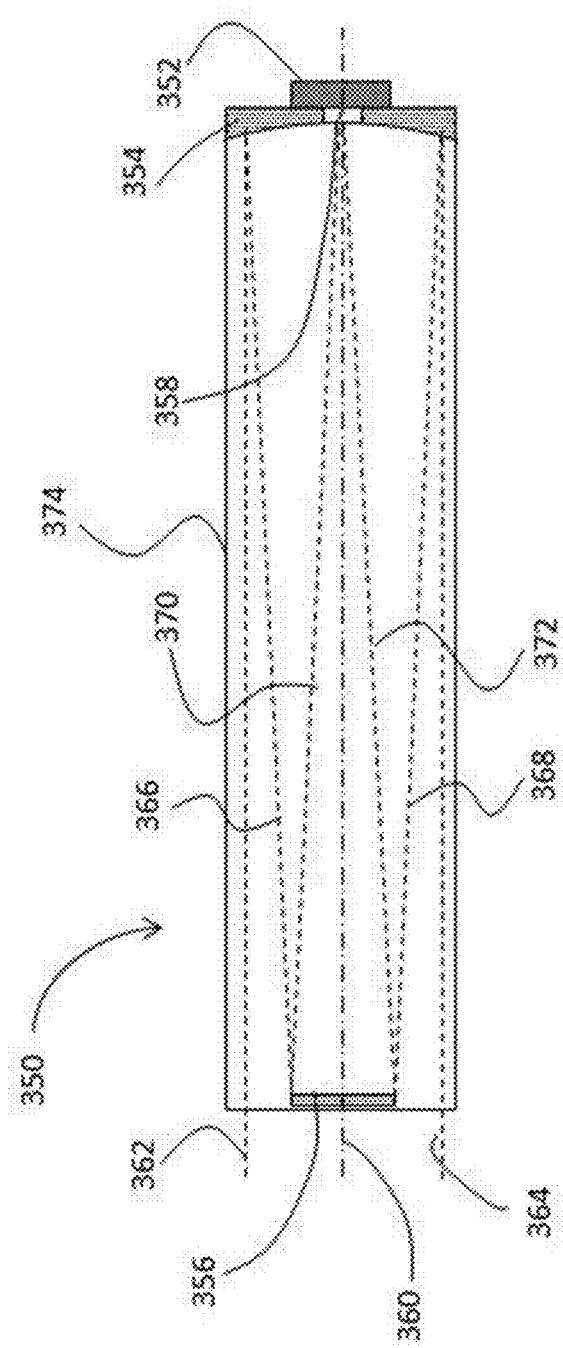

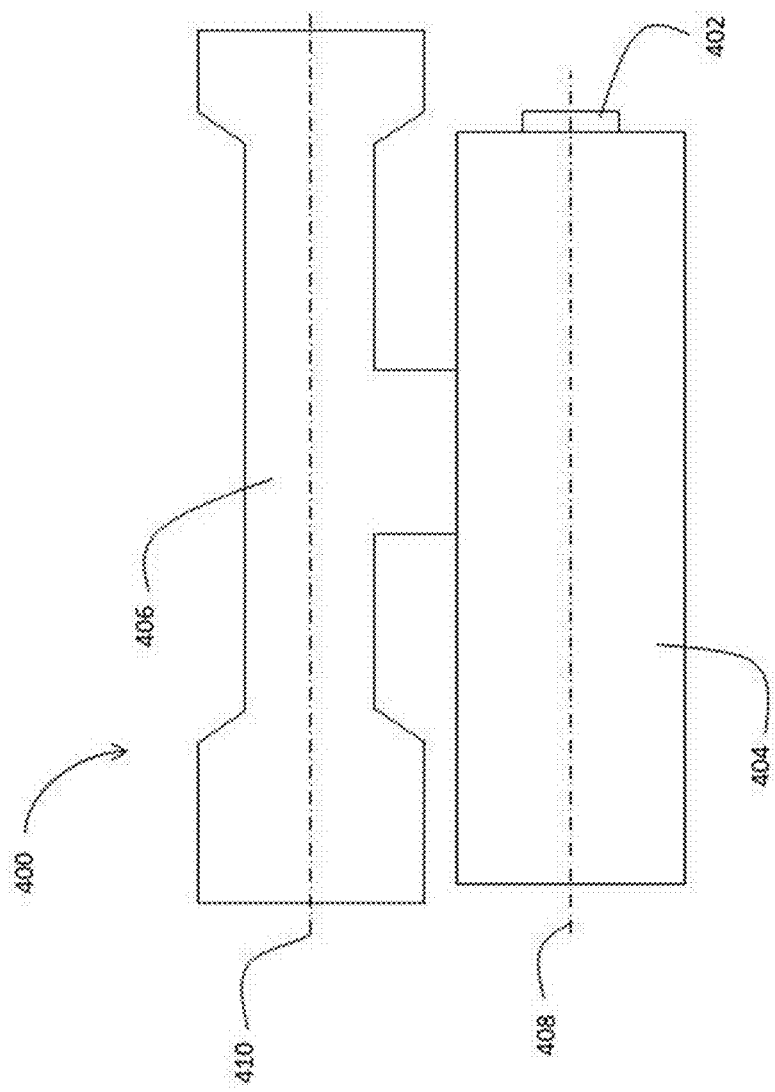

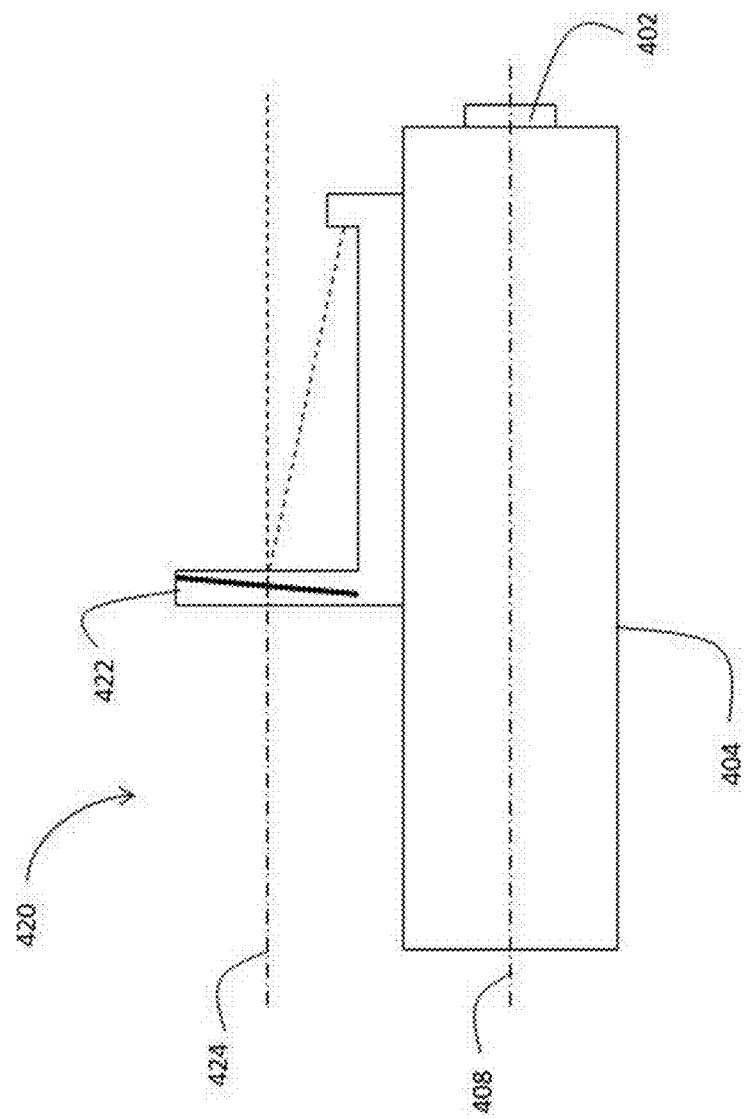

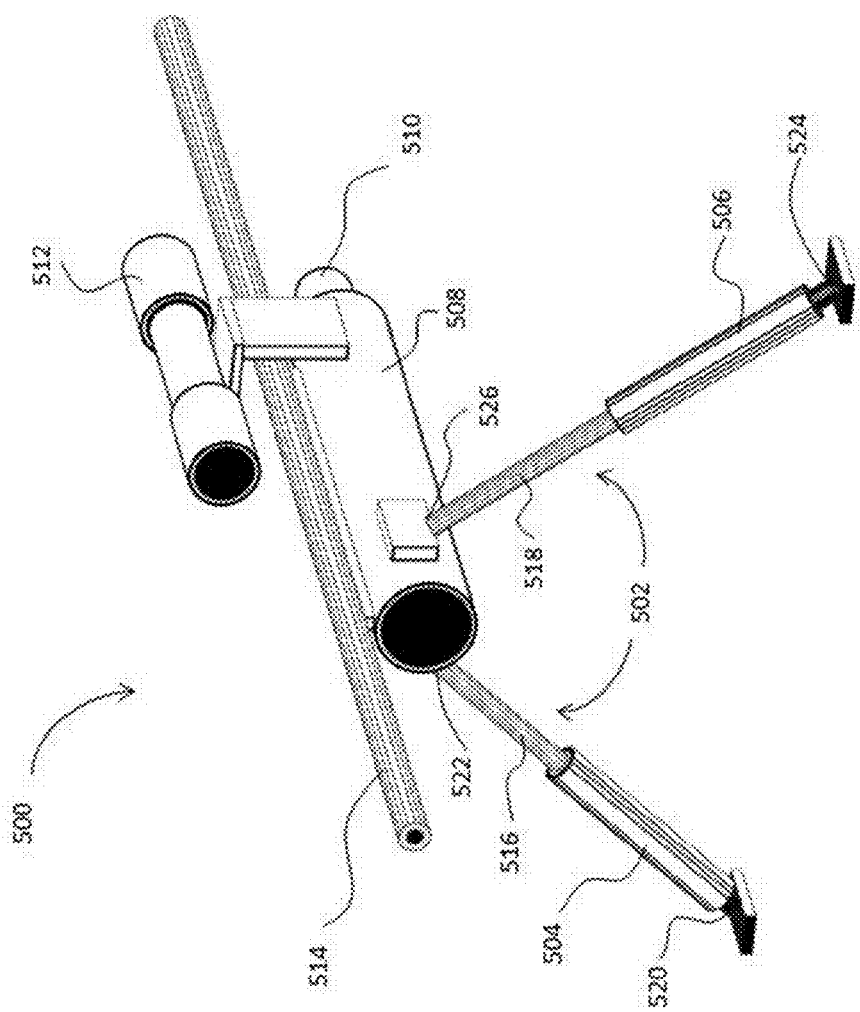

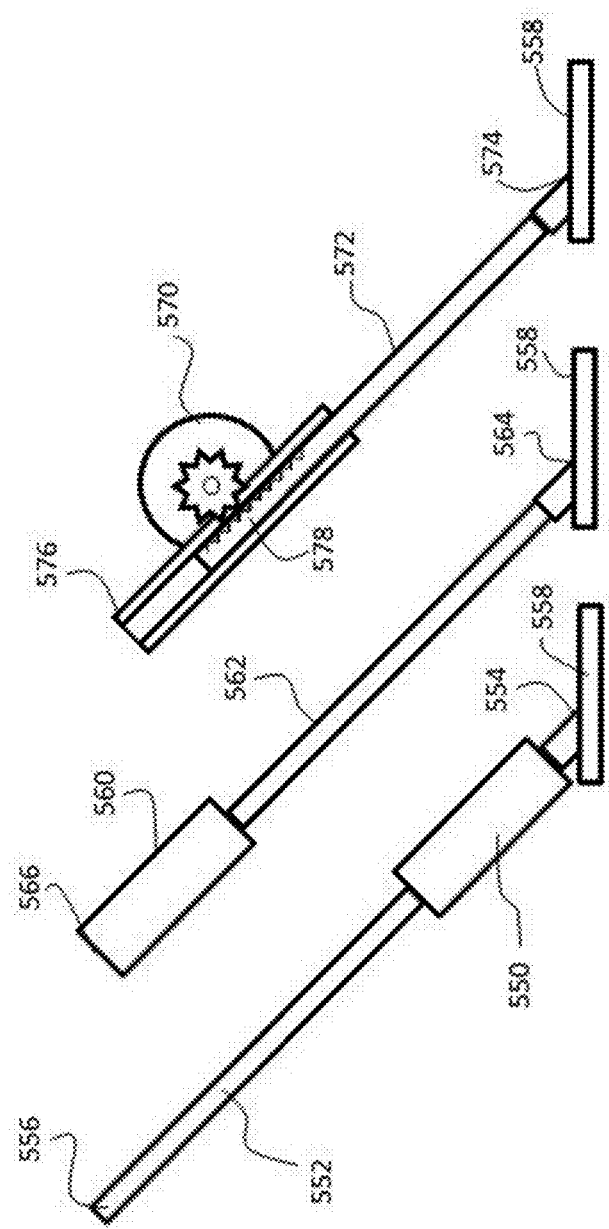

BOLOMETRIC INFRARED QUADRANT DETECTORS AND USES WITH FIREARM APPLICATIONS

CROSS-REFERENCE TO RELATED APPLICATIONS

This application claims the benefit of U.S. Provisional Application No. 61/952,246, filed Mar. 13, 2014, entitled "Hybrid Sight With Infrared Position Sensor," and also claims the benefit of U.S. Provisional Application No. 61/919,982, filed Dec. 23, 2013, entitled "Bolometric Quadrant Infrared Detector," and the entire contents of each of these applications are hereby incorporated by reference.

TECHNICAL FIELD

This document describes bolometric infrared detectors and related applications, including bolometric infrared quadrant detectors that can be used with sights for firearms and with positioning elements for firearms.

BACKGROUND

A bolometer is a device that can be used to measure the power of radiation that is incident on the bolometer. In general, a bolometer can be used as a resistive device whose resistance varies with a temperature of the bolometer or of a portion of the bolometer (e.g., an absorptive portion of the bolometer). In general, the temperature of the bolometer or portion of the bolometer may be affected by incident radiation, or lack thereof, on the bolometer. For example, as the bolometer or a portion of the bolometer is warmed by incident radiation, the resistance of the bolometer may increase. Conversely, when the bolometer or a portion of the bolometer is cooled, for example because of a reduction in intensity of incident radiation or removal of incident radiation on the bolometer or a portion of the bolometer, the resistance of the bolometer may decrease.

A quadrant detector is a sensor that includes four quadrants, where each of the four quadrants represents a sub-sensor of the overall quadrant detector sensor. The quadrant detector may produce output signals that may be read by a dedicated read-out circuit that is implemented as an integrated circuit.

A sight is a device used to aim a weapon. A telescopic sight, sometimes also called a "scope," is a sighting device based on an optical refracting telescope, and includes a reticle or graphic image pattern to provide an aiming point. A collimator sight or "red dot" sight typically uses a red light-emitting diode ("LED") at the focus of collimating optics that a user uses as an aiming point for the firearm.

A bipod is an attachment for a firearm. The bipod includes two legs, where each leg includes a base, or foot, at the end of the leg. The bipod can provide stability for the firearm when the feet of the bipod are rested on a surface, which can aid in steadying the firearm for improved aiming.

SUMMARY

In a first general aspect, a thermal position sensor includes a collection of micro-bolometers, where each of the micro-bolometers has an electrical resistance, and each of the micro-bolometers includes a substrate and an absorptive element. The absorptive element is suspended above the substrate and configured to absorb infrared radiation, including 10-micron long-wavelength infrared radiation. A change in a temperature of the micro-bolometer caused by infrared radiation incident on the absorptive element causes a change in the resistance of the micro-bolometer. The collection of micro-bolometers is partitioned into a first quadrant of the sensor, a second quadrant of the sensor, a third quadrant of the sensor, and a fourth quadrant of the sensor, where each of the quadrants represents a 90-degree segment of the sensor and includes at least one micro-bolometer of the collection of micro-bolometers. Each of the quadrants includes at least one output signal that provides information indicative of a temperature of the quadrant based on a resistance associated with the at least one micro-bolometer of the quadrant.

Implementations may include one or more of the following. Each of the quadrants may include a single micro-bolometer of the collection of micro-bolometers. Each of the quadrants may include two or more micro-bolometers of the collection of micro-bolometers, where the two or more micro-bolometers may be electrically connected and configured to cooperatively provide an indication of temperature for the respective quadrant based on resistances of the two or more micro-bolometers. Each of the quadrants may include two or more groups of micro-bolometers, and each of the groups may include two or more micro-bolometers of the collection of micro-bolometers, where the two or more micro-bolometers may be electrically connected and configured to cooperatively provide an indication of temperature for the respective group based on resistances of the two or more micro-bolometers. The thermal position sensor may also include a thermoelectric cooler disposed underneath the collection of micro-bolometers and configured to cool the collection of micro-bolometers.

In a second general aspect, a tracking system includes a thermal position sensor. The thermal position sensor includes a collection of micro-bolometers, where each of the micro-bolometers has an electrical resistance. Each of the micro-bolometers includes a substrate and an absorptive element, and the absorptive element is suspended above the substrate and configured to absorb infrared radiation, including 10-micron long-wavelength infrared radiation. A change in a temperature of the micro-bolometer caused by infrared radiation incident on the absorptive element causes a change in the resistance of the micro-bolometer. The collection of micro-bolometers is partitioned into a first quadrant of the sensor, a second quadrant of the sensor, a third quadrant of the sensor, and a fourth quadrant of the sensor, and each of the quadrants represents a 90-degree segment of the sensor and includes at least one micro-bolometer of the collection of micro-bolometers. Each of the quadrants includes at least one output signal that provides information indicative of a temperature of the quadrant based on a resistance associated with the at least one micro-bolometer of the quadrant. The tracking system also includes an optical element configured to receive infrared radiation and focus the infrared radiation into a beam of infrared radiation on the thermal position sensor. The tracking system further includes an electronic unit configured to receive the at least one output signal from each of the quadrants of the thermal position sensor and determine a position of the beam of infrared radiation on the thermal position sensor relative to first, second, third and fourth quadrants of the thermal position sensor. The electronic unit is further configured to determine a positional adjustment and provide one or more command signals representing the positional adjustment. The tracking system further includes a positioning element configured to receive the one or more command signals from the electronic unit and positionally adjust one or more components of the tracking system based on the received one or more command signals.

Implementations may include one or more of the following. The positioning element may include a first motor and a second motor. The electronic unit may be further configured to determine whether a threshold level of infrared radiation is incident on the thermal position sensor based on the received at least one output signal from each of the quadrants of the thermal position sensor, and the electronic unit may be further configured to provide an indication of whether the threshold level of infrared radiation is incident on the thermal position sensor to a user of the tracking system. The tracking system may further include a firearm to which the tracking system is attached, and the firearm may include a striker and an interlock for the striker, and the electronic unit may be further configured to provide a command signal for controlling the interlock of the striker based on the determination of whether a threshold level of infrared radiation is incident on the thermal position sensor. Each of the quadrants may include two or more groups of micro-bolometers, and each of the groups may include two or more micro-bolometers of the collection of micro-bolometers, and the two or more micro-bolometers may be electrically connected and configured to cooperatively provide an indication of temperature for the respective group based on resistances of the two or more micro-bolometers. The electronic unit may include, for each of the groups, a switch for activating or deactivating the group based on a state of the switch, and the electronic unit may be configured to control the state of the switch. The electronic unit may be adapted to configure the switches to activate a first subset of the groups and to deactivate a second subset of the groups, where the first subset of the groups represents an effective thermal position sensor of reduced size compared to the thermal position sensor. The tracking system may further include an optical sight, and coarse aiming with the tracking system may be performed using the optical sight and fine aiming may be performed by the thermal position sensor, the electronic unit, and the positioning element.

In a third general aspect, a tracking system includes a bipod that includes a first leg and a second leg orthogonal to the first leg. The bipod also includes a first positioning element and a second positioning element, where the first positioning element is configured to adjust a distance between a first end of the first leg and a second end of the first leg, and the second positioning element is configured to adjust a distance between a first end of the second leg and a second end of the second leg. The tracking system also includes a thermal position sensor that includes a collection of micro-bolometers, where each of the micro-bolometers has an electrical resistance. Each of the micro-bolometers includes a substrate and an absorptive element, and the absorptive element is suspended above the substrate and configured to absorb infrared radiation, including 10-micron long-wavelength infrared radiation. A change in a temperature of the micro-bolometer caused by infrared radiation incident on the absorptive element causes a change in the resistance of the micro-bolometer. The collection of micro-bolometers is partitioned into a first quadrant of the sensor, a second quadrant of the sensor, a third quadrant of the sensor, and a fourth quadrant of the sensor, and each of the quadrants represents a 90-degree segment of the sensor and includes at least one micro-bolometer of the collection of micro-bolometers. Each of the quadrants includes at least one output signal that provides information indicative of a temperature of the quadrant based on a resistance associated with the at least one micro-bolometer of the quadrant. The tracking system further includes an optical element configured to receive infrared radiation and focus the infrared radiation into a beam of infrared radiation on the thermal position sensor. The tracking system further includes an electronic unit configured to receive the at least one output signal from each of the quadrants of the thermal position sensor and determine a position of the beam of infrared radiation on the thermal position sensor relative to first, second, third and fourth quadrants of the thermal position sensor. The electronic unit is further configured to determine a positional adjustment and provide a first command signal to the first positioning element and a second command signal to the second positioning element.

Implementations may include one or more of the following. A first axis of the thermal position sensor may be aligned with the first leg of the bipod, and a second axis of the thermal position sensor may be aligned with the second leg of the bipod. The first positioning element may be a linear motor and may be coaxial with the first leg, and the second positioning element may be a linear motor and may be coaxial with the second leg. The first linear motor may be disposed near the first end of the first leg, and the second linear motor may be disposed near the first end of the second leg. The first linear motor may be disposed near the second end of the first leg, and the second linear motor may be disposed near the second end of the second leg. The first and second positioning elements may be rotary motors. The first leg may include a first joint, and a positional adjustment by the first positioning element may cause at least a portion of the first leg to pivot about the joint. The system may be configured to automatically perform fine aiming when the first leg and the second leg are in contact with a surface, and the system may also be configured to automatically perform fine aiming when one or both of the first leg and the second leg are not in contact with the surface.

BRIEF DESCRIPTION OF THE DRAWINGS

FIG. 6a is a top view of the example quadrant detector of FIG. 5, illuminated by incident radiation.

FIG. 6c is a top view of the example quadrant detector of FIG. 6b, following a further positional adjustment.

FIG. 7 is a top view of an example quadrant detector.

FIG. 8 is a top view of another example quadrant detector, where each of the four quadrants includes four groups of micro-bolometers.

FIG. 9a is a top view of the example quadrant detector of FIG. 8, illuminated by incident radiation.

FIG. 9b is a top view of the example quadrant detector of FIG. 9a, following a positional adjustment.

FIG. 10 is a top view of an example quadrant detector that includes a first subset of groups of micro-bolometers configured in an active mode and a second subset of groups of micro-bolometers configured in an inactive mode.

FIG. 11 is a top view of the example quadrant detector of FIG. 10, with an active portion of the detector shifted.

FIG. 16a is a schematic diagram of an example input circuit.

FIG. 16b is a schematic diagram of another example input circuit.

FIG. 17a is side view of an example infrared optical system and an example infrared sensor.

FIG. 19 is a side view of an example hybrid sight that includes an example infrared sensor, an example infrared optical system, and an example telescopic sight.

FIG. 20 is a side view of another example hybrid sight that includes an example infrared sensor, an example infrared optical system, and an example collimator sight.

FIG. 21 is a perspective view of an example tracking system.

FIG. 22a is a front view of an example positioning element and an example leg of an example bipod.

FIG. 22b is a front view of another example positioning element and an example leg of an example bipod.

FIG. 22c is a front view of yet another example positioning element and an example leg of an example bipod.

Like reference symbols in the various drawings indicate like elements.

DETAILED DESCRIPTION

Figure 1:
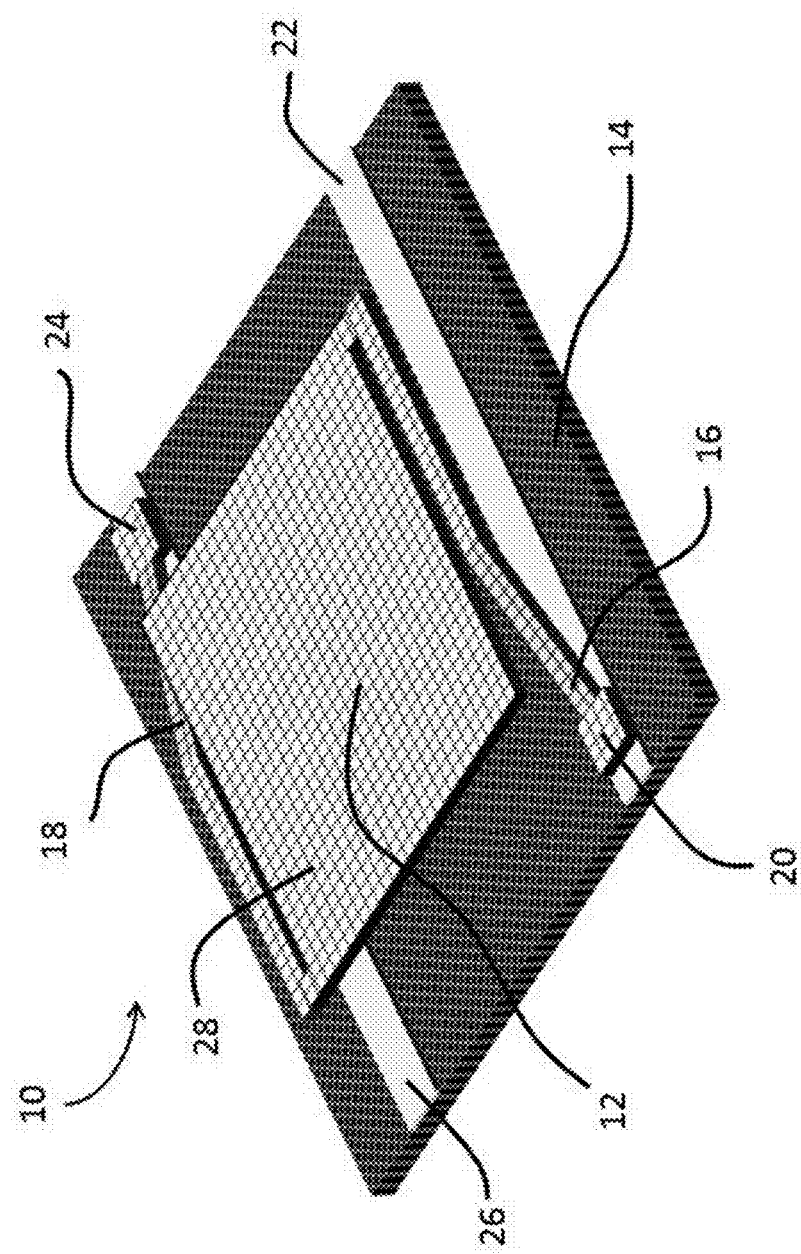
FIG. 1 is an upper perspective view of an example micro-bolometer element.

Described herein are bolometric infrared sensors, including bolometric infrared detectors configured as quadrant detectors, which can be used for infrared range position sensing, for example. The sensors can be used with tracking systems, according to some implementations, and can be used to track targets that emit, for example, 10-micron-range long-wavelength infrared radiation, even, for example, if the targets are generally not emitting (or emitting only trace amounts of) radiation in the visible portion of the radiation spectrum. In some examples, the quadrant detectors use one or more micro-bolometers, such as an array of four or more micro-bolometers or bolometer elements. In some examples, each quadrant of the quadrant detectors includes one or more groups of micro-bolometers, where each of the groups includes two or more micro-bolometers. Micro-bolometers within a group, or within a quadrant, can be electrically connected in a variety of configurations (e.g., serially, in parallel, or in one of several combinations of serial and parallel), as will be described herein below. Some examples of the sensors use micro-bolometers connected in groups at the "on-chip" level, and some examples of the sensors can eliminate a need for a dedicated integrated read-out circuit that is included with the sensor (e.g., may eliminate need for a dedicated read-out circuit on an underside of the sensor). Some examples of the sensors can simplify packaging, such as by eliminating a need for flip-chip packaging. Some examples of the sensors have one or more (e.g., one, two, four, eight, or more) direct outputs for each group of micro-bolometers, or for each quadrant. Some examples of the sensors can reduce costs and improve reliability and robustness of the sensors. Some examples of sensors discussed herein can recognize relative temperature in a projection of a target on or in a vicinity of the focal plane. Some examples of multi-element sensors discussed herein can be used as position sensors to determine a deviation from center or from an optical axis, for example.

Described herein also are various applications for which the sensors described herein may be used. For example, the sensors can be used with sights for firearms, such as small arms (e.g., revolvers, pistols, rifles, shotguns, carbines, assault rifles, submachine guns, light machine guns, and the like) and light weapons (e.g., heavy machine guns, hand-held grenade launchers, portable anti-aircraft and anti-tank guns, recoilless rifles, portable launchers, mortars, and the like), and with one or more positioning elements for firearms. In some examples, firearm accuracy may be improved using the devices and techniques described herein. In some examples, aiming accuracy for the firearm may be improved using the devices and techniques described herein. In some examples, aiming selectivity for the firearm may be improved using the devices and techniques described herein. In some examples, aiming time may be reduced using the devices and techniques described herein. In some examples, shooting efficiency may be increased using the devices and techniques described herein. For example, shooting efficiency of a firearm may be improved using the devices and techniques described herein, according to some examples, based on improved aiming selectivity and accuracy, and by reduced aiming time. In some examples, devices and systems discussed herein can be used to add thermal position sensing to a conventional sighting system for a fraction of the cost of a traditional thermal viewer sight.

FIG. 1 is an upper perspective view of an example micro-bolometer 10, sometimes also referred to as a micro-bolometer element. The micro-bolometer 10 is sensitive to a temperature change of the micro-bolometer 10, such as a temperature change caused by infrared radiation (or other types of radiation) that is incident to the micro-bolometer, and a change in temperature at the micro-bolometer causes a change in an electrical property of the micro-bolometer 10. For example, a resistance associated with the micro-bolometer 10 may change when the temperature of the micro-bolometer 10 changes.

The depicted example micro-bolometer 10 includes a generally thermally isolated and suspended bridge 12, supported above a substrate 14 by a first leg 16 and a second leg 18 of the micro-bolometer 10. The micro-bolometer 10 includes a first terminal 20 that is electrically connected to a first output line 22, and includes a second terminal 24 that is electrically connected to a second output line 26. In some examples, either the first terminal 20 or the second terminal 24 may be electrically connected to the substrate 14, for example. In the depicted example, the output lines 22, 26 are electrically isolated from the substrate 14, but in some examples (e.g., when the substrate 14 serves as a common ground), one or more of the output lines may be electrically coupled to the substrate 14. In some examples, the bridge 12 may comprise a membrane.

The micro-bolometer 10 in this example includes one or more temperature-sensitive layers 28 deposited on (or otherwise applied to) the bridge 12, for example. In some examples, the bridge 12 may be temperature-sensitive (e.g., based on a material property of the bridge), and may not include the one or more temperature sensitive layers 28. In some examples, the one or more temperature-sensitive layers 28 (or the bridge 12 itself for examples that do not include the temperature-sensitive layers 28) may be configured or optimized to absorb infrared radiation (e.g., 10-micron infrared range or shorter wavelength infrared radiation), or other types of radiation. In some examples, the one or more temperature-sensitive layers 28 (or the bridge 12) may be optimized to absorb radiation from a radiation beam or photon beam. For example, infrared radiation incident on the one or more temperature-sensitive layers 28 (or the bridge 12) may increase the temperature of the one or more temperature-sensitive layers 28 (or the bridge 12), and may cause a change in a resistance between the first terminal 20 and the second terminal 24 of the micro-bolometer 10. Such a change in resistance may be detected by electronics (e.g., as one or more of a change in a measured voltage, a change in a measured current, or a change in measured resistance), as will be described herein below, and various actions can be taken as a result of the change in temperature and/or resistance, for example. In some examples, the micro-bolometer 10 is contained within an enclosure (not shown in FIG. 1), and a vacuum or low-pressure environment is created within the enclosure. The depicted example micro-bolometer 10 is a simplified example of a micro-bolometer structure, and many other micro-bolometer structures are possible.

In general, various properties of the micro-bolometer may be tuned. For example, a material of the bridge of the micro-bolometer may be selected to tune an amount of resistance change for an amount of temperature change. Several factors may be tuned depending on a desired resistance per micro-bolometer, for example, including a size of the micro-bolometer, one or more materials from which the micro-bolometer is constructed (e.g., a material of the bridge), and a thickness of the bridge 12 (e.g., a thickness of the membrane for bridges that include a membrane). With some materials, an increase in temperature of the micro-bolometer causes an increase in resistance of the micro-bolometer, and a decrease in temperature of the micro-bolometer causes a decrease in resistance of the micro-bolometer. With other materials, an increase in temperature causes a decrease in resistance, while a decrease in temperature causes an increase in resistance. Without limitation, the examples discussed herein will assume that an increase in temperature of the micro-bolometer results in an increased resistance of the micro-bolometer.

Figure 2:
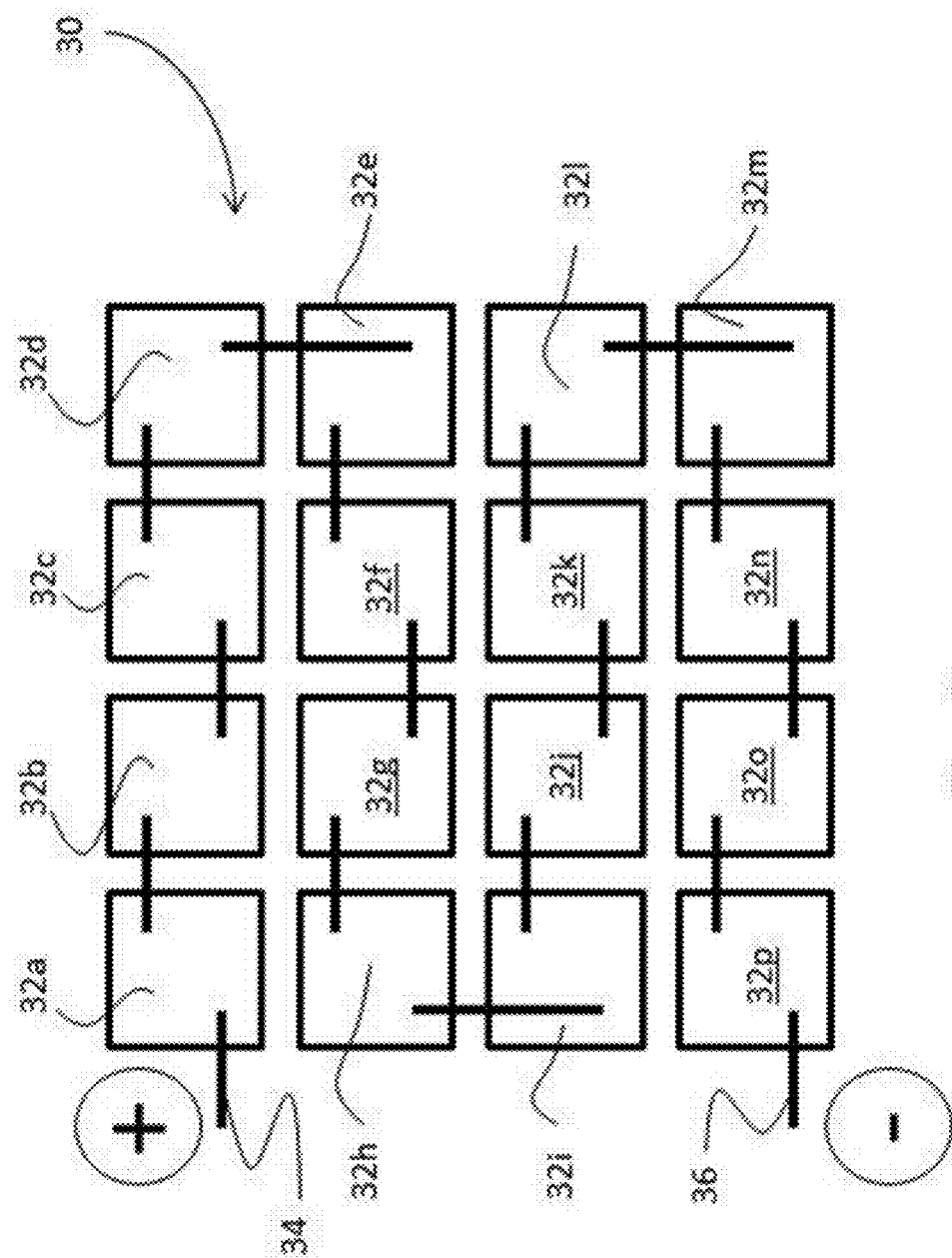
FIG. 2 is a top view of an example collection of micro-bolometers.

FIG. 2 is a top view of an example collection 30 of micro-bolometers. The collection 30 is an example of one of many ways to configure a collection of micro-bolometers. The example collection 30 includes sixteen micro-bolometers 32a-32p, each electrically connected in a series configuration. For example, a first micro-bolometer 32a is electrically connected in series with a second micro-bolometer 32b, which is electrically connected in series with a third micro-bolometer 32c, which is electrically connected in series with a fourth micro-bolometer 32d, which is electrically connected in series with a fifth micro-bolometer 32e, which is electrically connected in series with a sixth micro-bolometer 32f, which is electrically connected in series with a seventh micro-bolometer 32g, which is electrically connected in series with an eighth micro-bolometer 32h, which is electrically connected in series with a ninth micro-bolometer 32i, which is electrically connected in series with a tenth micro-bolometer 32j, which is electrically connected in series with an eleventh micro-bolometer 32k, which is electrically connected in series with a twelfth micro-bolometer 32l, which is electrically connected in series with a thirteenth micro-bolometer 32m, which is electrically connected in series with a fourteenth micro-bolometer 32n, which is electrically connected in series with a fifteenth micro-bolometer 32o, which is electrically connected in series with a sixteenth micro-bolometer 32p. Because the micro-bolometers 32a-32p are connected in series, a resistance between a first terminal 34 and a second terminal 36 of the collection 30 is an additive combination of the individual resistances of the micro-bolometers 32a-32p, where the first terminal 34 is a terminal of the first micro-bolometer 32a and the second terminal 36 is a terminal of the sixteenth micro-bolometer 32p. In some examples, the collection 30 of micro-bolometers may represent a quadrant (or a portion of a quadrant) in a quadrant detector sensor. In some examples, the collection 30 of micro-bolometers may represent a group of a quadrant. In some examples, a different number (e.g., 2, 3, 4, 5, 6, 7, 8, 9, 10, 11, 12, 13, 14, 15, or more) of micro-bolometers may be used for the collection 30 of micro-bolometers.

Figure 3:
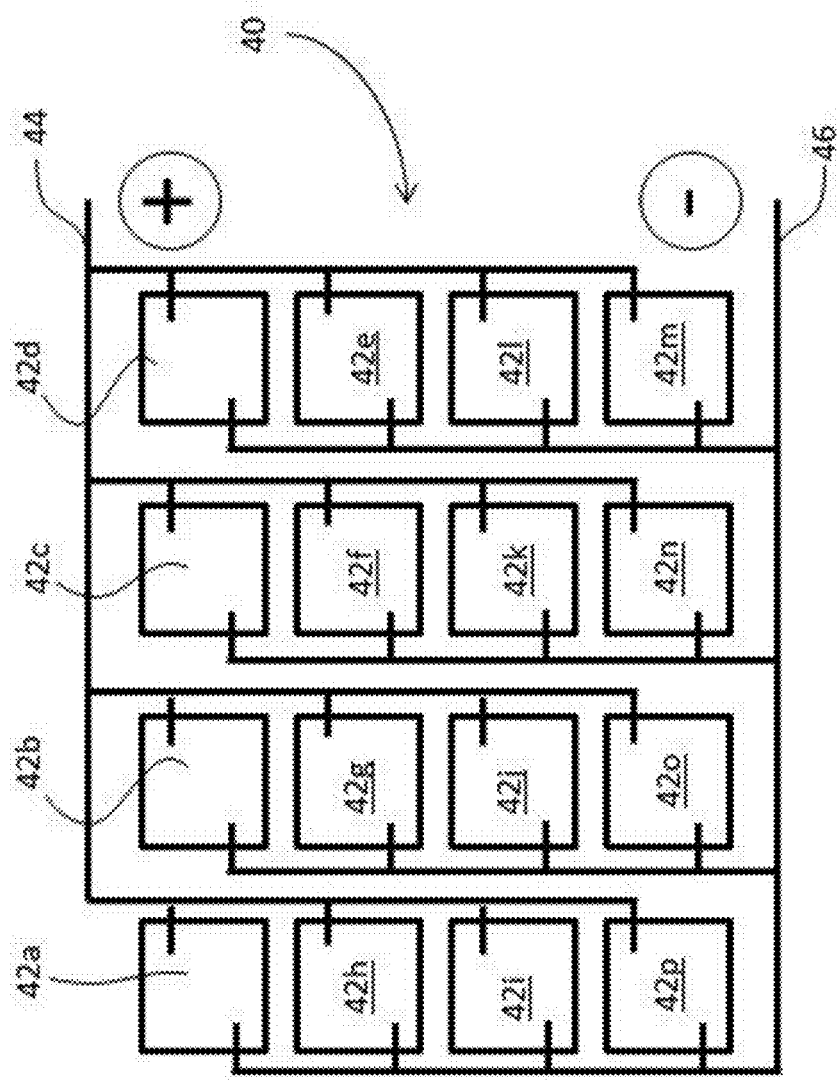
FIG. 3 is a top view of another example collection of micro-bolometers.

FIG. 3 is a top view of another example collection 40 of micro-bolometers. The collection 40 is an example of one of many ways to configure a collection of micro-bolometers. The example collection 40 includes sixteen micro-bolometers 42a-42p, each electrically connected in a parallel configuration. For example, a first micro-bolometer 42a is electrically connected in parallel with a second micro-bolometer 42b, which is electrically connected in parallel with a third micro-bolometer 42c, which is electrically connected in parallel with a fourth micro-bolometer 42d, which is electrically connected in parallel with a fifth micro-bolometer 42e, which is electrically connected in parallel with a sixth micro-bolometer 42f, which is electrically connected in parallel with a seventh micro-bolometer 42g, which is electrically connected in parallel with an eighth micro-bolometer 42h, which is electrically connected in parallel with a ninth micro-bolometer 42i, which is electrically connected in parallel with a tenth micro-bolometer 42j, which is electrically connected in parallel with an eleventh micro-bolometer 42k, which is electrically connected in parallel with a twelfth micro-bolometer 42l, which is electrically connected in parallel with a thirteenth micro-bolometer 42m, which is electrically connected in parallel with a fourteenth micro-bolometer 42n, which is electrically connected in parallel with a fifteenth micro-bolometer 42o, which is electrically connected in parallel with a sixteenth micro-bolometer 42p. Because the micro-bolometers 42a-42p are connected in parallel, a resistance between a first terminal 44 and a second terminal 46 of the parallel collection 40 is an inverse of the sum of the inverses of the individual resistances of the micro-bolometers 42a-42p. In some examples, the collection 40 of micro-bolometers may represent a quadrant (or a portion of a quadrant) in a quadrant detector sensor. In some examples, the collection 40 of micro-bolometers may represent a group of a quadrant. In some examples, a different number (e.g., 2, 3, 4, 5, 6, 7, 8, 9, 10, 11, 12, 13, 14, 15, or more) of micro-bolometers may be used for the collection 40 of micro-bolometers.

Figure 4:
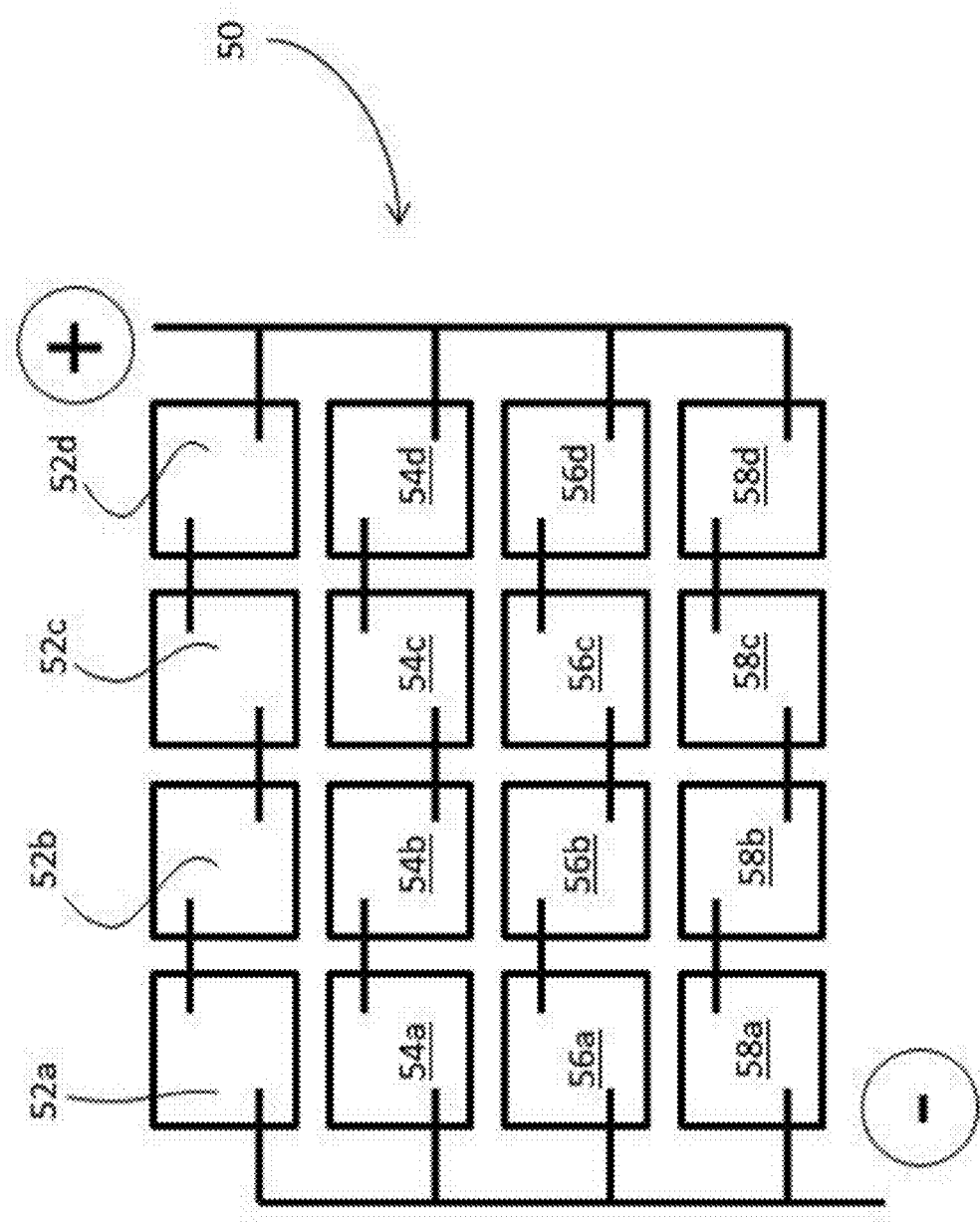
FIG. 4 is a top view of yet another example collection of micro-bolometers.

FIG. 4 is a top view of yet another example collection 50 of micro-bolometers. The collection 50 is an example of one of many ways to configure a collection of micro-bolometers. The example collection 50 includes sixteen micro-bolometers. A first subset of the collection 50 includes four micro-bolometers 52a, 52b, 52c, and 52d, each electrically connected in series. A second subset of the collection 50 includes four micro-bolometers 54a, 54b, 54c, and 54d, each electrically connected in series. A third subset of the collection 50 includes four micro-bolometers 56a, 56b, 56c, and 56d, each electrically connected in series. A fourth subset of the collection 50 includes four micro-bolometers 58a, 58b, 58c, and 58d, each electrically connected in series. Each of the four subsets 52a-52d, 54a-54d, 56a-56d, and 58a-58d is then electrically connected in parallel. As such, collection 50 of micro-bolometers includes four subsets of micro-bolometers, where each of the subsets of micro-bolometers is electrically connected in parallel, and where each of the subsets includes four micro-bolometers electrically connected in series. In some examples, the collection 50 of micro-bolometers may represent a quadrant (or a portion of a quadrant) in a quadrant detector sensor. In some examples, the collection 50 of micro-bolometers may represent a group of a quadrant.

In some examples, a different number (e.g., 2, 3, 5, 6, 7, 8, or more) of serially connected micro-bolometers may be used for each of the subsets of the collection, and in some examples a different number of parallel-connected subsets (e.g., 2, 3, 5, 6, 7, 8 or more) may be used. For example, a collection having two subsets of micro-bolometers connected in parallel, where each subset includes two serially connected micro-bolometers, may be used. As another example, a collection having three subsets of micro-bolometers connected in parallel, where each subset includes three serially connected micro-bolometers, may be used. As yet another example, a collection having five subsets of micro-bolometers connected in parallel, where each subset includes five serially connected micro-bolometers, may be used. As yet another example, a collection having two subsets of micro-bolometers connected in parallel, where each subset includes four serially connected micro-bolometers, may be used. As yet another example, a collection having four subsets of micro-bolometers connected in parallel, where each subset includes two serially connected micro-bolometers, may be used.

Figure 5:
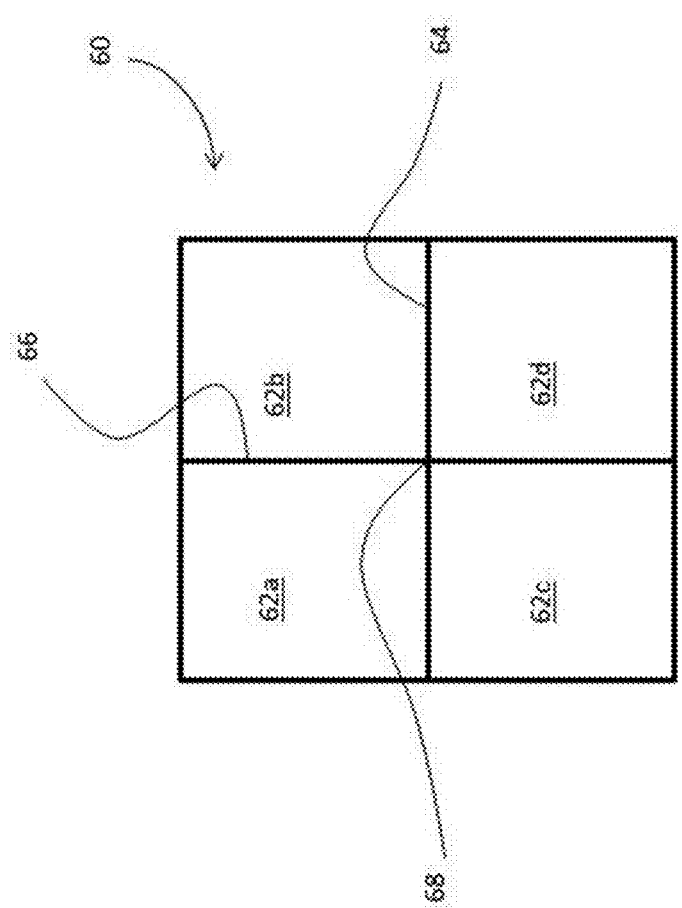
FIG. 5 is top view of an example quadrant detector.

FIG. 5 is top view of an example quadrant detector 60. The example quadrant detector 60 includes four micro-bolometers 62a, 62b, 62c, and 62d, and each of the four micro-bolometers 62a-62d represents one quadrant of the four-quadrant detector 60. For example, a first micro-bolometer 62a represents a first quadrant of the quadrant detector 60, and is shown in this example as representing an upper-left quadrant of the detector. A second micro-bolometer 62b represents a second quadrant of the quadrant detector 60, and is shown in this example as representing an upper-right quadrant of the detector. A third micro-bolometer 62c represents a third quadrant of the quadrant detector 60, and is shown in this example as representing a lower-left quadrant of the detector, and a fourth micro-bolometer 62d represents a fourth quadrant of the quadrant detector 60, and is shown in this example as representing a lower-right quadrant of the detector. In this example, each of the four quadrants of the quadrant detector 60 is represented by a single micro-bolometer. In other examples, one or more (e.g., all) of the quadrants may be represented by two or more (e.g., 2, 3, 4, 5, 6, 7, 8, 9, 10, 11, 12, 13, 14, 15, 16, or more) micro-bolometers, and in examples where two or more micro-bolometers are included in a quadrant, the two or more micro-bolometers may be electrically configured in a variety of ways (e.g., serially, in parallel, or in a combination of serially and in parallel). Each of the micro-bolometers 62a-62d may include one (for example in the case of a common ground) or two output signals, which may be used by electronics (not shown in FIG. 5), as will be discussed herein below.

The quadrant detector 60 includes a first axis 64 of the quadrant detector and a second axis 66 of the quadrant detector. The first and second axes 64, 66 generally separate the four quadrants of the detector, where each quadrant represents a 90-degree segment or section of the detector (e.g., each quadrant representing 90 degrees of the full 360 degrees of the detector). The first axis 64 and the second axis 66 are orthogonal or perpendicular with one another (e.g., separated from one another by 90 degrees), and intersect at an origin or center 68 of the quadrant detector 60. The center 68 represents an efficient center of the quadrant detector 60, and represents a point at which the four quadrants may intersect. The example quadrant detector 60 in FIG. 5 is shown in a classical representation, where the first axis 64 has a horizontal orientation, and the second axis 66 has a vertical orientation.

In this example, the first axis 64 is defined by bottom edges of the first quadrant (e.g., first micro-bolometer 62a) and the second quadrant (e.g., second micro-bolometer 62b), and by top edges of the third quadrant (e.g., third micro-bolometer 62c) and the fourth quadrant (e.g., fourth micro-bolometer 62d). The second axis 66 is defined by right edges of the first quadrant (e.g., first micro-bolometer 62a) and the third quadrant (e.g., third micro-bolometer 62c), and by left edges of the second quadrant (e.g., second micro-bolometer 62b) and the fourth quadrant (e.g., fourth micro-bolometer 62d). The first axis 64 and the second axis 66 are orthogonal or perpendicular with one another, and intersect at the center 68 of the quadrant detector 60.

In some non-classical representation examples, the quadrant detector 60 may be rotated, such that the axes 64, 66 of the quadrant detector 60 are at orientations other than horizontal and vertical, respectively. For example, the quadrant detector may be rotated 45 degrees clockwise as compared to the depicted detector 60 in FIG. 5. In such an example, the first axis 64 and the second axis 66 may accordingly also be rotated 45 degrees clockwise, and the axes may still be orthogonal or perpendicular with one another, and may still define the center of the detector at the point where the axes intersect. Alternatively, the quadrant detector may be rotated 45 degrees counter-clockwise, which may cause the first axis 64 and the second axis 66 to also be rotated 45 degrees counter-clockwise. In other examples, quadrant detector rotations at angles other than 45 degrees (e.g., plus or minus 30 degrees, plus or minus 60 degrees, plus or minus 90 degrees, plus or minus 120 degrees, plus or minus 135 degrees, plus or minus 150 degrees) may be used. In general, several of the detectors discussed herein will be depicted in a classical representation format, where axes that separate quadrants of the detector have horizontal and vertical representations, but any of the detectors discussed herein may be rotated at any of the angles discussed above, for example.

FIG. 6a is a top view of the example quadrant detector 60 of FIG. 5, illuminated by incident radiation 70. The incident radiation 70 has a circular shape in this example, and is shown as incident on the detector 60 in the upper-left quadrant. As described above with reference to FIG. 5, detector 60 includes a single micro-bolometer for each of its four quadrants, but other examples can include two or more micro-bolometers per quadrant. In this example, the radiation 70 is incident on micro-bolometer 62a, and may cause a temperature of micro-bolometer 62a to increase. For example, a temperature-sensitive layer or portion of micro-bolometer 62a (e.g., a bridge or membrane of the micro-bolometer) may absorb the radiation 70, which may cause the temperature of the micro-bolometer 62a or a portion of the micro-bolometer to increase. This increase in temperature at the micro-bolometer 62a may cause a change in an electrical property of the micro-bolometer 62a, such as an increase in a resistance of the micro-bolometer 62a. The increased resistance of micro-bolometer 62a, and of the upper-left quadrant of the detector 60, may be detected and/or measured by electronics (not shown in FIG. 6a), as will be described more fully below. By contrast, temperatures and resistances of the other micro-bolometers 62b, 62c, and 62d of the detector 60 that are unaffected by the incident radiation 70 may remain unchanged as a result of the incident radiation 70 on the upper-left quadrant.

Based on this detected or measured change in electrical property for one or more of the quadrants (or a portion of the quadrant), one or more actions may be caused to occur. For example, electronics may provide one or more outputs (e.g., command signals) that may cause one or more position changes to occur. In some position tracking examples, it may be desirable to cause a position change that results in the incident radiation 70 being centered at the center 68 of the quadrant detector 60. The electronics may provide one or more command or control signals to one or more motors or other positioning elements, for example, and the one or more motors or other positioning elements may induce motion that causes a position of one or more of the detector 60 or an optical system associated with the detector (or both) to change.

Figure 6B:
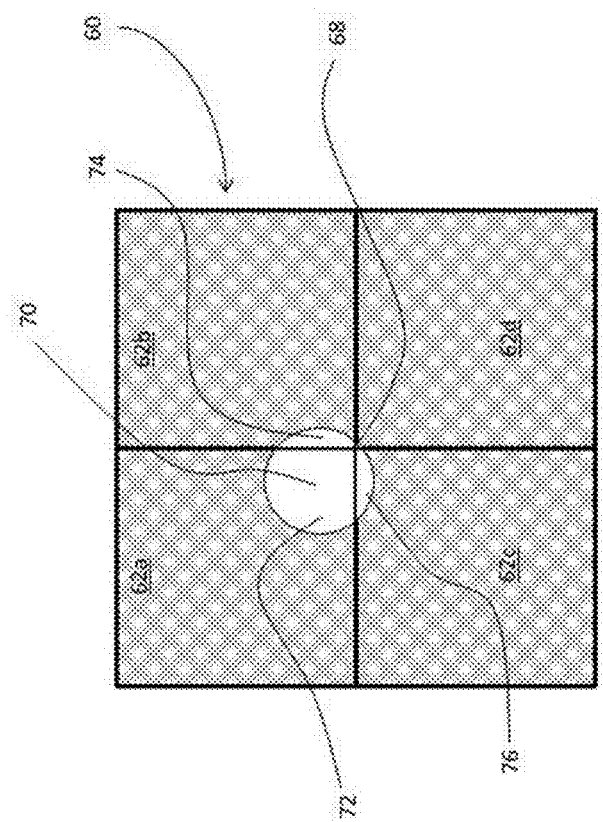
FIG. 6b is a top view of the example quadrant detector of FIG. 6a, following a positional adjustment.

FIG. 6b is a top view of the example quadrant detector 60 of FIG. 6a, following a positional adjustment. The positional adjustment has caused the radiation 70 to now be partially incident on three quadrants of the detector 60. For example, a majority 72 of the radiation 70 remains incident on the upper-left quadrant (represented by micro-bolometer 62a), a first smaller portion 74 of the radiation 70 is now incident on the upper-right quadrant (represented by micro-bolometer 62b), and a second yet smaller portion 76 of the radiation 70 is now incident on the lower-left quadrant (represented by micro-bolometer 62c). The lower-right quadrant (represented by micro-bolometer 62d) remains generally unaffected by the radiation 70, for example because no portion of the radiation 70 is incident on the lower-right quadrant of the detector.

As compared to the situation in FIG. 6a, the temperature of micro-bolometer 62a may decrease slightly, as a reduced amount of the radiation is incident on the upper-left quadrant in FIG. 6b as compared to FIG. 6a, for example because some of the radiation in FIG. 6b is incident on the upper-right and lower-left quadrants rather than all of the radiation 70 being incident on the upper-left quadrant (e.g., as in FIG. 6a). As such, the resistance of micro-bolometer 62a may decrease slightly. The temperature of micro-bolometer 62b in the upper-right quadrant may increase, based on the now-incident portion 74 of the radiation 70 on the micro-bolometer 62b. As such, the resistance of micro-bolometer 62b may increase. Similarly, the temperature of micro-bolometer 62c in the lower-left quadrant may increase, based on the now-incident portion 76 of the radiation 70 on the micro-bolometer 62c, and the resistance of micro-bolometer 62c may increase. In some examples, the resistance increase associated with the lower-left quadrant may be less than the resistance increase associated with the upper-right quadrant, for example because a smaller portion 76 of the radiation 70 is incident on the lower-left quadrant as compared to the upper-right quadrant (where a slightly larger portion 74 is incident in FIG. 6b). The temperature and resistance of micro-bolometer 62d in the lower-right quadrant may remain unchanged. As can be seen when comparing FIG. 6b and FIG. 6a, the positional adjustment, which may occur based on output signals from the quadrant detector 60 of FIG. 6a, has resulted in FIG. 6b in the radiation 70 being closer to the center 68 of the detector 60.

FIG. 6c is a top view of the example quadrant detector 60 of FIG. 6b, following a further positional adjustment. The further positional adjustment has caused the radiation 70 to now be generally centered about the center 68 of the detector 60, so that substantially equal portions 80a, 80b, 80c and 80d of the radiation 70 are incident, respectively, on each of the upper-left, upper-right, lower-left and lower-right quadrants of the detector 60. As can be seen when comparing FIG. 6c and FIG. 6b, the further positional adjustment, which may occur based on output signals from the quadrant detector 60 of FIG. 6b, has resulted in FIG. 6c in the radiation 70 being closer to the center 68 of the detector 60.

FIG. 7 is a top view of an example quadrant detector 90. The example quadrant detector 90 includes four quadrants, where each of the four quadrants includes four micro-bolometers. In this example, for each of the four quadrants, the four micro-bolometers included in a particular quadrant are electrically connected in series. For example, an upper-left quadrant of the detector 90 includes a first micro-bolometer 92a that is serially connected to a second micro-bolometer 92b, which is serially connected to a third micro-bolometer 92c that is serially connected to a fourth micro-bolometer 92d. The upper-left quadrant includes a first terminal 94a and a second terminal 94b, where the first terminal 94a is associated with the first micro-bolometer 92a and the second terminal 94b is associated with the fourth micro-bolometer 92d. Similarly, an upper-right quadrant includes four micro-bolometers 96a-d, connected serially, and first and second terminals 98a and 98b. In a similar fashion, a lower-left quadrant and a lower-right quadrant each include four serially connected micro-bolometers and two terminals.

As compared to the detector 60 of FIGS. 5 and 6a-6c, which included a single micro-bolometer per quadrant, detector 90 of FIG. 7 includes multiple micro-bolometers (four in this example) per quadrant. The micro-bolometers 96a-96d of the upper-right quadrant are shaded or highlighted, in the FIG. 7 example, to illustrate or draw attention to the multiple (four in this case) micro-bolometers of the (upper-right) quadrant of the detector 90. Radiation incident on any one or more of the four micro-bolometers per quadrant may impact the resistance of the quadrant, for example. In this manner, and like several of the examples described herein, the micro-bolometers of a particular quadrant may cooperate to provide a temperature-sensitive resistance value for the quadrant representative of a level of radiation incident on the quadrant, for example. Electronics (not shown in FIG. 7) may react to the resistances of the quadrants, or to changes in resistances of the quadrants, and may cause one or more actions (e.g., one or more position changes) to occur as a result. In other examples, the micro-bolometers of a given quadrant may be electrically connected in any of the other ways described herein; in some examples such connections may occur at the on-chip level, and in other examples such connections may occur off-chip (e.g., at an electronic unit, for example).

While the detector 90 of FIG. 7 has been described above as a quadrant detector, in other examples the detector 90 of FIG. 7 may represent a single quadrant of a larger quadrant detector. For example, micro-bolometers 92a-92d may represent a first group of a quadrant (e.g., an upper-left group of the quadrant); micro-bolometers 96a-96d may represent a second group (e.g., an upper-right group of the quadrant); the four micro-bolometers in the lower-left corner of detector 90 may represent a third group of a quadrant (e.g., a lower-left group of the quadrant); and the four micro-bolometers in the lower-right corner of detector 90 may represent a fourth group of a quadrant (e.g., a lower-right group of the quadrant). Such a quadrant detector may include 64 micro-bolometers (sixteen per quadrant, for example).

FIG. 8 is a top view of another example quadrant detector 100. Detector 100 includes four quadrants, each of which represents a generally 90-degree segment of the detector 100. A first quadrant 102, representing an upper-left quadrant of the detector 100, includes sixteen micro-bolometers, where the sixteen micro-bolometers are segmented into four groups (the groups are bounded by dashed lines in FIG. 8), each group having four micro-bolometers. A first group 104 of the first quadrant 102 includes four micro-bolometers 106a, 106*b*, 106*c*, and 106*d*, which are shown for illustrative purposes in a generic 2×2 representation in FIG. 8. In general, the four micro-bolometers 106*a*-106*d* of first group 104 may be electrically connected in any appropriate configuration. For example, the four micro-bolometers 106*a*-106*d* may be connected in series, in parallel, or in a combination of series and parallel (e.g., a parallel connection of two sub-groups of two serially connected micro-bolometers). A second group 108 of the first quadrant 102 includes micro-bolometers 110*a*, 110*b*, 110*c*, and 110*d*, where the four micro-bolometers 110*a*-110*d* may be electrically connected in any appropriate configuration (e.g., series, parallel, or a combination of series and parallel). A third group 112 of the first quadrant 102 includes micro-bolometers 114*a*, 114*b*, 114*c*, and 114*d*, where the four micro-bolometers 114*a*-114*d* may be electrically connected in any appropriate configuration (e.g., series, parallel, or a combination of series and parallel). A fourth group 116 of the first quadrant 102 includes micro-bolometers 118*a*, 118*b*, 118*c*, and 118*d*, where the four micro-bolometers 118*a*-118*d* may be electrically connected in any appropriate configuration (e.g., series, parallel, or a combination of series and parallel). In some examples, the micro-bolometers in each of the four groups 104, 108, 112, 116 are similarly configured (e.g., in series, in parallel, or in a combination of serial and parallel). In some examples, one or more output signals from each of the groups 104, 108, 112, 116 are provided to electronics.

A second quadrant 120, representing an upper-right quadrant of the detector 100, also includes sixteen micro-bolometers, where the sixteen micro-bolometers are segmented into four groups 122, 124, 126, 128 of four micro-bolometers. The first group 122 of the second quadrant 120 includes four micro-bolometers 130*a*-130*d*; the second group 124 of the second quadrant 120 includes four micro-bolometers 132*a*-132*d*; the third group 126 of the second quadrant 120 includes four micro-bolometers 134*a*-134*d*; and the fourth group 128 of the second quadrant 120 includes four micro-bolometers 136*a*-136*d*. In some examples, the micro-bolometers in each of the four groups 122, 124, 126, 128 are similarly configured (e.g., in series, in parallel, or in a combination of serial and parallel). In some examples, the micro-bolometers in each of the four groups 122, 124, 126, 128 of the second quadrant 120 are configured similarly to the groups of the first quadrant 102. In some examples, one or more output signals from each of the groups 122, 124, 126, 128 are provided to electronics.

Similarly, a third quadrant 138, representing a lower-left quadrant of the detector 100, also includes sixteen micro-bolometers, where the sixteen micro-bolometers are segmented into four groups 140, 142, 144, and 146, which respectively include micro-bolometers 148*a*-148*d*, 150*a*-150*d*, 152*a*-152*d*, and 154*a*-154*d*. In some examples, the micro-bolometers in each of the four groups 140, 142, 144, 146 of the third quadrant 138 are similarly configured (e.g., in series, in parallel, or in a combination of serial and parallel). In some examples, the micro-bolometers in each of the four groups 140, 142, 144, 146 of the third quadrant 138 are configured similarly to the groups of the first quadrant 102, to the groups of the second quadrant 120, or to the groups of both the first quadrant 102 and the second quadrant 120. In some examples, one or more output signals from each of the groups 140, 142, 144, 146 are provided to electronics.

Finally, a fourth quadrant 156, representing a lower-right quadrant of the detector 100, also includes sixteen micro-bolometers, where the sixteen micro-bolometers are segmented into four groups 158, 160, 162 and 164, where the four groups respectively include micro-bolometers 166*a*-166*d*, 168*a*-168*d*, 170*a*-170*d*, and 172*a*-172*d*. In some examples, the micro-bolometers in each of the four groups 158, 160, 162, 164 of the fourth quadrant 156 are similarly configured (e.g., in series, in parallel, or in a combination of serial and parallel). In some examples, the micro-bolometers in each of the four groups 158, 160, 162, 164 of the fourth quadrant 156 are configured similarly to the groups of the first, second, or third quadrants 102, 120, 138. In some examples, one or more output signals from each of the groups 158, 160, 162 164 are provided to electronics.

In some examples, the micro-bolometers within each of the groups of the detector are commonly configured. For example, each of the micro-bolometers within a group may be connected in series, in parallel, or in a combination of series and parallel, and two output signals (across which a voltage may be read, for example) may be provided from each group, or alternatively one output signal may be provided from each group for examples where the groups share a common potential (e.g., share a common "ground"). In some examples, more than two (e.g., 3, 4, 6, 8, or more) output signals may be provided from each group.

In some examples, each of the quadrants 102, 120, 138, and 156 of the detector 100 may be represented by the detector 90 of FIG. 7 and described above. Each quadrant 102, 120, 138, and 156 may be considered a sub-detector of the quadrant detector 100, for example. In examples where each quadrant of the detector 100 is represented by the detector 90 of FIG. 7, each group of the quadrant can include two output terminals, for example, and a voltage may be read across the two output terminals (e.g., by one or more components of an electronic unit, not shown in FIG. 8). Alternatively, if a common ground is used across the groups, or across the groups in a quadrant, for example, then in some examples a single output terminal may be provided from each group, and a voltage may be read between the output signal and the common ground, for example.

FIG. 9*a* is a top view of the example quadrant detector 100 of FIG. 8, illuminated by incident radiation 110. The incident radiation 110 has a circular shape in this example, and is depicted as incident on portions of three quadrants of the detector 100. A large portion of the incident radiation 110 is incident on the fourth (lower-right) quadrant 156, and smaller portions of the incident radiation 110 are incident on the second (upper-right) and third (lower-left) quadrants 120 and 138. No portion of the radiation 110 is incident on the first (upper-left) quadrant 102. The incident radiation 110 is off-center of the detector 100 in FIG. 9*a*, and in some examples it may be desirable to detect where upon the detector the radiation 110 is currently incident, and to cause a positional adjustment to center the incident radiation.

Referring again to FIG. 9*a* and with respect to the fourth (lower-right) quadrant 156, the radiation 110 is incident on each of the four micro-bolometers 166*a*-166*d* of group 158 of the fourth quadrant 156, and is incident on micro-bolometers 168*a* and 168*c* of group 160 of the fourth quadrant 156, and on micro-bolometers 170*a* and 170*b* of group 162 of the fourth quadrant 156. Because the radiation 110 is incident on substantially the entire top surfaces of the four micro-bolometers 166*a*-166*d* of group 158, while being only incident on portions of the top surfaces of micro-bolometers 168*a* and 168*c* of group 160 and micro-bolometers 170*a* and 170*b* of group 162, the temperatures of micro-bolometers 166*a*-166*d* may be higher than the temperatures of micro-bolometers 168*a*, 168*c*, 170*a* and 170*b*. As such, resistances associated with micro-bolometers 166*a*-166*d* may be higher than resistances associated with micro-bolometers 168*a*, 168*c*, 170*a* and 170*b*. Micro-bolometers of the quadrant 156 that are not exposed to the radiation 110 (e.g., micro-bolometers 168*b*, 168*d*, 170*c*, 170*d*, and 172*a*-172*d* in this example) may have a lower temperature and lower resistances as compared to the micro-bolometers described above that are exposed to the radiation, for example.

With reference now to the second (upper-right) quadrant 120, because the radiation 110 is incident on portions of micro-bolometers 134*c* and 134*d*, and is not incident on any other micro-bolometers (e.g., micro-bolometers 130*a*-130*d*, 132*a*-132*d*, 134*a*, 134*b*, 136*a*-136*d*) of the quadrant 120, temperatures of micro-bolometers 134*c* and 134*d* may be higher, and resistances associated therewith may be higher, when compared to temperatures and resistances, respectively, of the other micro-bolometers of the quadrant 120.

With reference now to the third (lower-left) quadrant 138, because the radiation 110 is incident on portions of micro-bolometers 150*b* and 150*d*, and is not incident on any other micro-bolometers (e.g., micro-bolometers 148*a*-148*d*, 150*a*, 150*c*, 152*a*-152*d*, 154*a*-154*d*) of the quadrant 138, temperatures of micro-bolometers 150*b* and 150*d* may be higher, and resistances associated therewith may be higher, when compared to temperatures and resistances, respectively, of the other micro-bolometers of the quadrant 138.

FIG. 9*b* is a top view of the example quadrant detector 100 of FIG. 9*a*, following a positional adjustment. Based on the readings from the quadrant detector 100 of FIG. 9, a positional adjustment has been made to center the incident radiation 110 at the center of the detector 100. As can be seen when comparing FIG. 9*b* and FIG. 9*a*, the positional adjustment, which may occur based on output signals from the quadrant detector 100 of FIG. 9*a*, has resulted in FIG. 9*b* in the radiation 110 being closer to the center of the detector 100.

In general, the micro-bolometers described herein have been depicted as having a generally rectangular shape or a generally square shape, but micro-bolometers that have other shapes can be used. In some examples, some or all of the micro-bolometers of a detector have a generally circular or generally elliptical shape. In some examples, some or all of the micro-bolometers of a detector can have a generally rectangular or square shape, but can have one or more rounded edges. In other examples, the micro-bolometers can have a generally triangular shape, a generally diamond shape, a generally "L" shape, a generally rhombus shape, a shape based on a portion or subset of any of the foregoing, or any other appropriate shape.

Also, the quadrant detectors, quadrants, and groups of micro-bolometers within a quadrant described herein have been depicted as having a generally rectangular shape or a generally square shape. In other examples, quadrant detectors, quadrants, and groups of micro-bolometers within a quadrant having other shapes can be used. For example, a quadrant detector, quadrant, or group of micro-bolometers within a quadrant can have, without limitation, a generally square shape, a generally rectangular shape, a generally circular shape, a generally elliptical shape, a generally triangular shape, a generally diamond shape, a generally "L" shape, a generally rhombus shape, a shape based on a portion or subset of any of the foregoing, or any other appropriate shape. In general, any of the sensors, quadrant detectors, quadrants, groups of micro-bolometers, or individual micro-bolometers described herein can have any of the shapes mentioned above.

In some examples, one or more groups of micro-bolometers of a quadrant detector may be configured in an active or "on" mode, and one or more groups of micro-bolometers of a quadrant detector may be configured in an inactive or "off" mode. This may be done in a variety of ways, for example, but in some cases a bias voltage may be provided to the micro-bolometers in groups configured as active, and a bias voltage may not be provided to the micro-bolometers in groups configured as inactive. In some examples, one or more switches (e.g., one or more micro-circuit switches external of the detector) may be used to provide or withhold a bias voltage to quadrants, or to groups within a quadrant, or to one or more individual micro-bolometers of the detector. In some examples, each group of micro-bolometers may be associated with a switch, and a state (e.g., open or closed) of the switch may determine whether or not a bias voltage is provided (e.g., by an electronic unit) to the micro-bolometers of the corresponding group.

In examples where incident radiation is expected to be limited or confined to a particular portion of the detector, for example, it may be desirable to configure the particular portion of the detector (e.g., a portion of the detector where the incident radiation is located or expected to be located) in an active mode, and to configure other portions of the detector in an inactive mode. For example, in a tracking system example where a target is being tracked or searched for, if an image of the target, represented by incident infrared radiation on a portion of the target, is substantially smaller than the sensitive surface of the target, the detector may be configured as a smaller effective detector that is limited to an active smaller subset of the total number of groups or micro-bolometers, for example. In some examples, this may provide one or more of improved signal-to-noise ratio, increased sensitivity, reduced power consumption, and reduced heat generation.

In some examples, an electronic unit that processes output signals from the detector may then process only those signals from active portions of the detector, for example, and may not process output signals from inactive portions of the detector. Because micro-bolometers or groups of micro-bolometers that are not illuminated by incident radiation may not contribute information indicative of a sensed target, but may contribute noise, restricting or limiting the full sensor to a smaller effective sensor may improve one or more signal-to-noise characteristics of the sensor or system, and may improve sensor sensitivity also, according to some implementations. In some examples, sensitivity may be improved, for example. By configuring a first portion of the detector in an active mode and a second portion of the detector in an inactive mode, power savings may be realized because fewer micro-bolometers are being powered, for example, and because fewer micro-bolometers are being powered, less heat may be generated by the sensor, for example.

Referring again to FIG. 8, in some examples it may be desirable to configure groups 116, 126, 142, and 158, the four groups closest to the center of the detector 100, in an active mode, and to configure the other groups 104, 108, 112, 122, 124, 128, 140, 144, 146, 160, 162, and 164 of the detector 100 in an inactive mode. This may be advantageous, for example, if it is known or expected that a target image may be located within the area of the sensor defined by the groups 116, 126, 142, and 158, for example. In some examples, an electronic unit (not shown in FIG. 8) may control a set of switches, where each switch is associated with one group of the detector 100, and where a particular state (e.g., open) of a switch may permit micro-bolometers of the corresponding group to operate in an active mode (e.g., by providing a bias voltage to the micro-bolometers), and where another state (e.g., closed) of the switch may permit micro-bolometers of the corresponding group to operate in an inactive mode (e.g., by not providing a bias voltage to the micro-bolometers).

FIG. 10 is a top view of an example quadrant detector 200 that includes a first subset of groups of micro-bolometers configured in an active mode and a second subset of groups of micro-bolometers configured in an inactive mode. In some examples, detector 200 may correspond to the quadrant detector 100 described above with reference to FIG. 8, with groups 116, 126, 142, and 158 of the detector 100 configured in an active mode, and groups 104, 108, 112, 122, 124, 128, 140, 144, 146, 160, 162, and 164 of the detector 100 configured in an inactive mode. For simplicity, reference designators for groups and micro-bolometers of detector 200 have been omitted from FIG. 10, but FIG. 8 may be referenced regarding group or micro-bolometer reference designators, for example.

As can be seen in FIG. 10, while the overall detector 200 includes 64 micro-bolometers, generically depicted in an 8×8 arrangement, detector 200 is operating as an effective detector having 16 micro-bolometers (those in groups 116, 126, 142, and 158) in a 4×4 arrangement, where the micro-bolometers in groups 116, 126, 142, and 158 are configured as active (and are illustratively highlighted in FIG. 10) and micro-bolometers in the remaining groups of the detector are inactive (and are not highlighted in FIG. 10). As such, the four active groups of detector 200 may act as a smaller, effective detector as compared to the larger detector 100 of FIG. 8, in this example.

In this example, group 116 may operate as the upper-left quadrant of the effective detector, group 126 may operate as the upper-right quadrant of the effective detector, group 142 may operate as the lower-left quadrant of the effective detector, and group 158 may operate as the lower-right quadrant of the effective detector. In this example, the center of the smaller effective detector may correspond to the center of the full-size or complete detector. In some examples, one or more positional adjustments may be made, based on readings or information from active groups 116, 126, 142, and 158 of the effective detector to center an incident radiation at the center of the effective detector.

In a position tracking application or aiming application, in some examples it may be desirable to compensate for or correct for winding (e.g., a left-to-right wind), and "shift" the active portion of the detector in a particular direction (e.g., shift the active portion of the detector left). Referring again to FIG. 8, it may be desirable to configure groups 112, 116, 140, and 142 in an active mode, and to configure the other groups 104, 108, 122, 124, 126, 128, 144, 146, 158, 160, 162, and 164 of the detector 100 in an inactive mode.

FIG. 11 is a top view of the example quadrant detector 200 of FIG. 10, with the active portion of the detector shifted (e.g., shifted to the left, in this example). Shifting of the active portion of the detector may be advantageous to compensate for or correct for external influences, such as winding, gravity, distance, or other external influences, for example. As can be seen in FIG. 11, detector 200 is operating as an effective detector having 16 micro-bolometers (those in groups 112, 116, 140, and 142) in a 4×4 arrangement, where the micro-bolometers in groups 112, 116, 140, and 142 are configured as active (and are illustratively highlighted in FIG. 11) and micro-bolometers in the remaining groups of the detector are inactive (and are not highlighted in FIG. 11). In this example, group 112 may operate as the upper-left quadrant of the effective detector, group 116 may operate as the upper-right quadrant of the effective detector, group 140 may operate as the lower-left quadrant of the effective detector, and group 142 may operate as the lower-right quadrant of the effective detector. In this example, the center of the smaller effective detector may correspond to the intersection of the four groups 112, 116, 140, and 142. As such, in this example, the center of the smaller effective detector differs from the center of the full-size or complete detector. In this example, the center of the smaller effective detector has shifted left, for example because it may be desired to compensate for a left-to-right wind. In some examples, one or more positional adjustments may be made, based on readings or information from active groups 112, 116, 140, and 142 of the effective detector to center an incident radiation at the center of the effective detector.

In other examples, it may be desirable to shift the center of the detector upwards (e.g., by activating groups 108, 122, 116, and 126, and inactivating the other groups), downwards (e.g., by activating groups 142, 158, 146, and 162, and inactivating the other groups), rightwards (e.g., by activating groups 126, 128, 158, and 160, and inactivating the other groups), upwards-and-leftwards (e.g., by activating groups 104, 108, 112, and 116, and inactivating the other groups), upwards-and-rightwards (e.g., by activating groups 122, 124, 126, and 128, and inactivating the other groups), downwards-and-leftwards (e.g., by activating groups 140, 142, 146, and 148, and inactivating the other groups), or downwards-and-rightwards (e.g., by activating groups 158, 160, 162, and 164, and inactivating the other groups). The various smaller effective detectors may be realized, for example, by activating the corresponding groups and by deactivating the other groups of the larger detector. Alternatively, a smaller yet effective detector may be realized by activating any single group of the detector, and treating each of the four micro-bolometers in the active group as a quadrant of the effective detector, where all remaining groups of the larger detector are inactivated.

Figure 12:
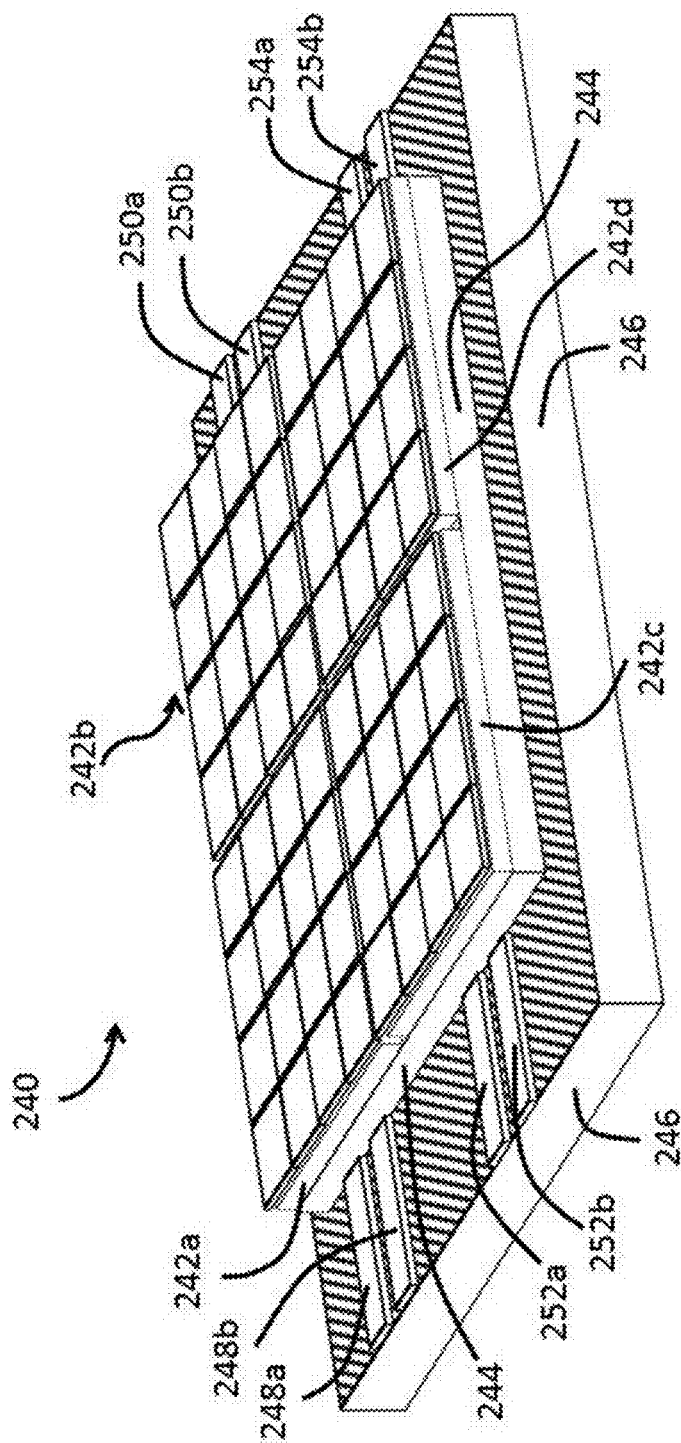
FIG. 12 is an upper perspective view of an example quadrant detector.

FIG. 12 is an upper perspective view of an example quadrant detector chip-on-carrier 240. The quadrant detector chip-on-carrier 240 includes a quadrant detector having four quadrants 242a, 242b, 242c, 242d, and each of the quadrants includes a 4×4 array of micro-bolometers. The micro-bolometers are mounted on a substrate 244. In general, the substrate 244 may function as a base of the detector for manufacturing. For example, the micro-bolometers may be manufactured on a silicon substrate (e.g., on a silicon substrate wafer). In general, several detectors may be manufactured on a single substrate, and the detectors may be later separated by wafer dicing, for example. In some examples, substrate thickness may be reduced during manufacturing. In some examples, the substrate may be partially or completely removed during the final stages of manufacturing.

Silicon is one example of a substrate material, but other materials can be used, such as silicon carbide. In some examples, the substrate 244 may serve as a heat sink for the micro-bolometers. Silicon carbide can be used as a substrate material in some examples, and can provide improved thermal conductivity, which may improve heat sink performance of the substrate.

The detector is mounted on a carrier 246, which provides mechanical support to the detector. In some examples, the detector chip may be mounted on the carrier 246 after wafer dicing. In some examples, the carrier 246 is a dielectric platform on which the detector is mounted. In some examples, the carrier 246 is a metal platform on which the detector is mounted. In some examples, the carrier 246 dissipates heat from the detector (e.g., functions as a heat sink). In general, the carrier 246 may have a square shape, rectangular shape, round shape, elliptical shape, or any other appropriate shape. In some examples, the carrier 246 is omitted.

In the depicted example of FIG. 12, two electrical output lines are shown for each of the four quadrants 242a, 242b, 242c, 242d. In other examples, a different number of output lines (e.g., 1, 3, 4, 6, 8, 10, 12, 14, 16, or more) may be provided for each quadrant. Referring again to FIG. 12, output lines 248a and 248b provide output signals from the first quadrant 242a; output lines 250a and 250b provide output signals from the second quadrant 242b; output lines 252a and 252b provide output signals from the third quadrant 242c; and output lines 254a and 254b provide output signals from the fourth quadrant 242d. The output lines 248a, 248b, 250a, 250b, 252a, 252b, 254a, and 254b are mounted on, and electrically insulated from, the carrier 246, in this example. In some examples, the output lines are metal conductors on an insulated base. In some examples, the output lines are a metal conductor supported by a dielectric base.

In general, the output lines may provide information from the detector to external electronics, or may allow external electronics to acquire information associated with the detector, or with one or more quadrants or one or more groups of micro-bolometers of the detector. For example, external electronics may read a first voltage across (or detect a current associated with) output lines 248a and 248b, which may correspond to a resistance value associated with the first quadrant 242a or to a temperature associated with quadrant 242a. External electronics may read a second voltage across (or detect a current associated with) output lines 250a and 250b, which may correspond to a resistance value associated with the second quadrant 242b or to a temperature associated with quadrant 242b. External electronics may read a third voltage across (or detect a current associated with) output lines 252a and 252b, which may correspond to a resistance value associated with the third quadrant 242c or to a temperature associated with quadrant 242c. External electronics may read a fourth voltage across (or detect a current associated with) output lines 254a, and 254b, which may correspond to a resistance value associated with the fourth quadrant 242d or to a temperature associated with quadrant 242d.

Figure 13:
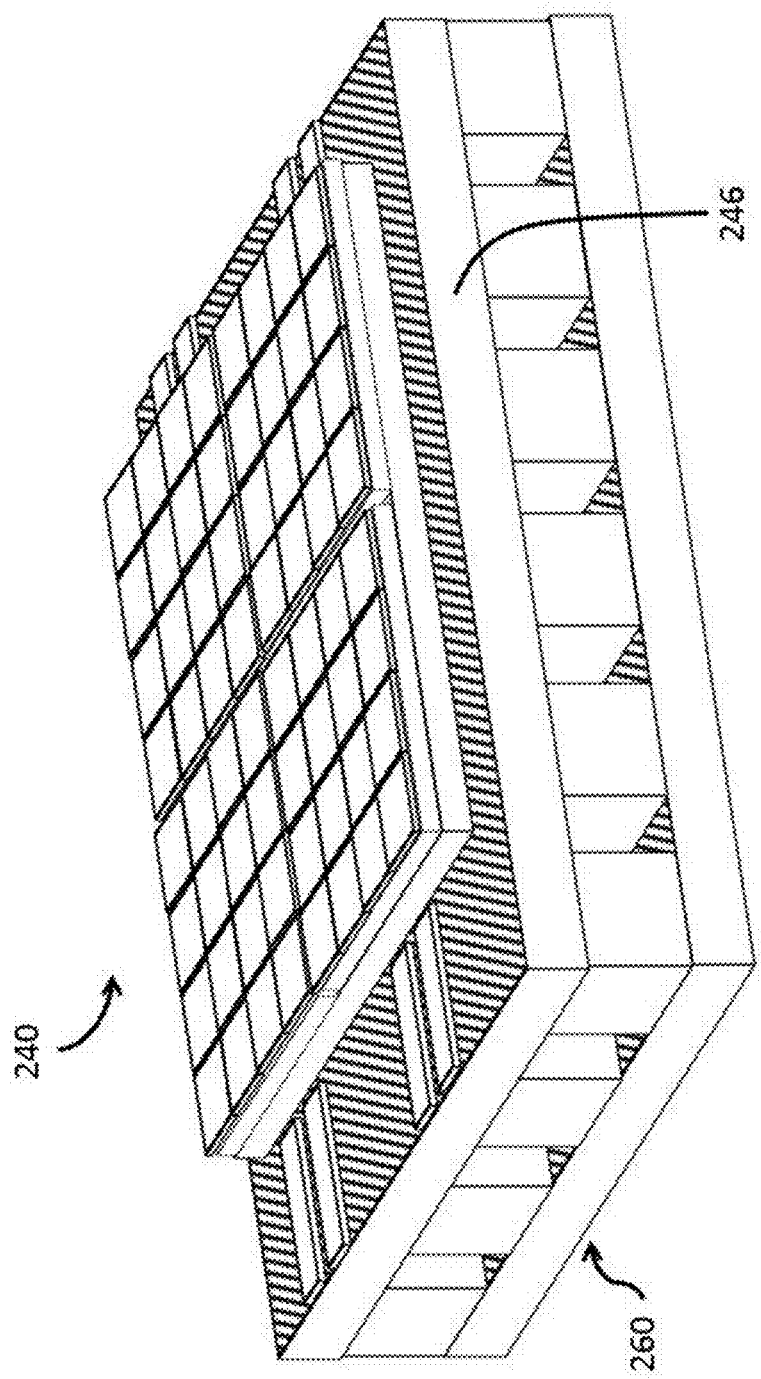
FIG. 13 is an upper perspective view of the quadrant detector of FIG. 12 mounted on a thermoelectric cooler.

FIG. 13 is an upper perspective view of the quadrant detector chip-on-carrier 240 of FIG. 12 mounted on a thermoelectric cooler 260. In various implementations, the carrier 246 of the detector (or the detector itself in implementations that do not include a carrier 246) may be placed or mounted on the thermoelectric cooler 260 to cool the detector and reduce the temperature of the detector, which may improve signal-to-noise parameters of the detector, for example.

The thermoelectric cooler 260 is an active cooling device that pulls heat away from the carrier 246 (or from the detector in implementations that do not use a carrier 246). In some examples, signal-to-noise ratio for the detector may be improved by actively cooling the detector, as by using a thermoelectric cooler. The thermoelectric cooler 260 uses electrical current to create a temperature difference between a top plate of the cooler and a bottom plate of the cooler, and facilitates transferring heat from the top plate to the bottom plate. In some examples, the carrier 244 may be integrated with the top plate of the thermoelectric cooler 260. A variety of thermoelectric coolers may be used. For example, a single-cascade thermoelectric cooler or a multi-cascade thermoelectric cooler may be used. In general, a multi-cascade thermoelectric cooler may provide a larger temperature difference and improved cooling, for example. In some examples, because the sensors described herein may not include a dedicated readout circuit on an underside of the sensor, the cooler may provide more effective cooling for the sensor. In some examples, the thermoelectric cooler 260 may be omitted. In general, one or more thermoelectric coolers, or other appropriate cooler, may be used with any of the detectors or sensors described herein.

Any of the sensors or detectors described herein may be used in tracking systems, where one or more targets may be identified and tracked, for example. In general, the one or more targets may emit infrared radiation, and in some examples may not emit radiation in the visible part of the spectrum. In some examples, the target may generally emit 10-micron range long-wavelength infrared radiation, and the sensors and tracking systems described herein may be used to identify and track such targets. In some examples, the target may be a mammal. In some examples, the target may be a human being. In some examples, the target or an object associated with the target (e.g., an engine of a vehicle or a hot gun barrel) may emit infrared radiation having shorter wavelengths.

Figure 14:
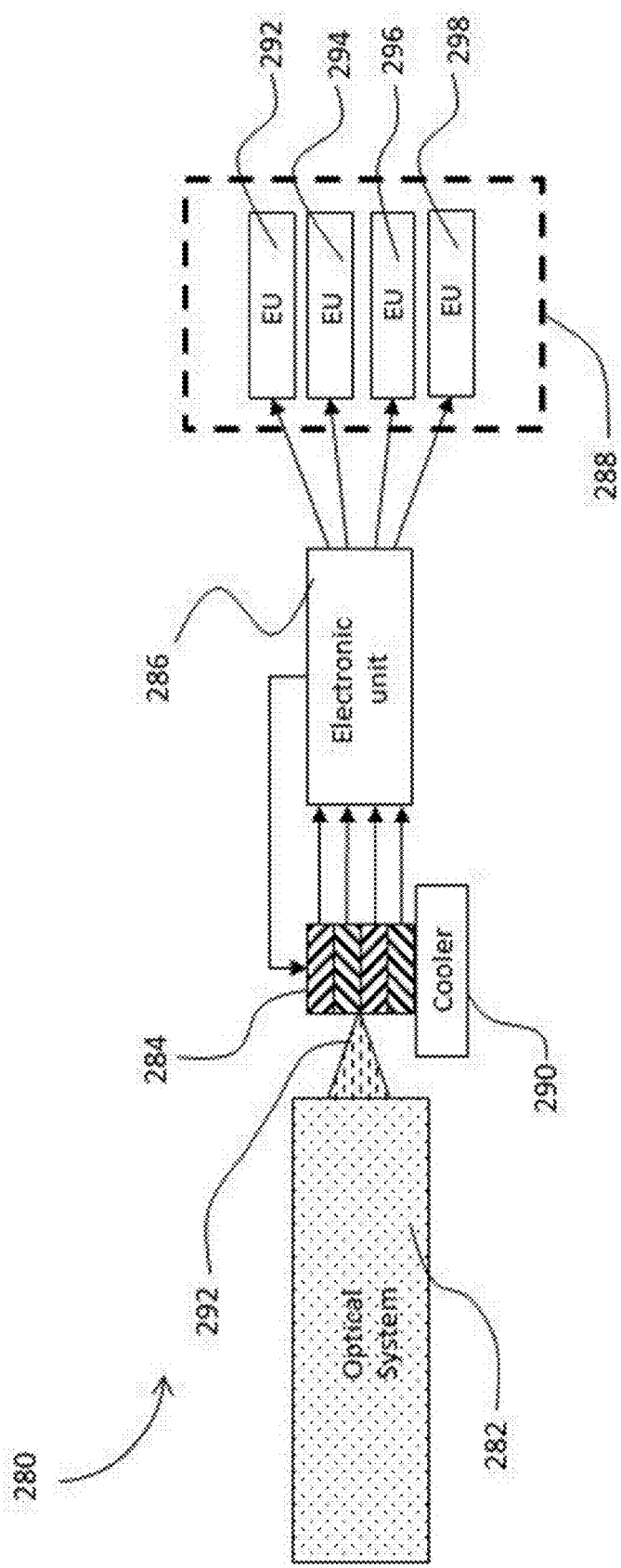
FIG. 14 is a block diagram of an example tracking system.

FIG. 14 is a block diagram of an example tracking system 280. In general, the tracking system 280 may be used for tracking applications, including for detection of a target and for fine aiming for improved accuracy in tracking the target. Tracking system 280 includes an example optical system 282, an example quadrant detector 284 (generically depicted in FIG. 14 as a detector having four shaded segments), an example electronic unit 286, and a set 288 of one or more example execution units. The quadrant detector 284 may correspond to any of the quadrant detectors discussed herein, for example. As with any of the detectors discussed herein, some examples of the detector 284 may include multiple sections, each configured to be sensitive to incident radiation at the corresponding section, so that beam position sensing may be implemented. A cooler 290 is shown below the quadrant detector 284 and may be used to cool the quadrant detector 284. The cooler 290 may correspond to the thermoelectric cooler 260 discussed above with reference to FIG. 13, or may correspond to any other appropriate cooler. In some examples, the cooler 290 may be omitted.

The optical system 282 may be an infrared optical system, according to some implementations, and may provide an infrared beam 292 that is directed onto the quadrant detector 284. Infrared beam 292 may correspond to the incident radiation 70, discussed above with reference to FIGS. 6a-6c, or to the incident radiation 110, discussed above with reference to FIGS. 9a and 9b, for example. In general, for examples where the optical system is an infrared optical system, the optical system 282 receives or collects infrared radiation from a target (and possibly also from objects or areas in a vicinity of the target) and may form an image of the target (and possibly also of objects or areas in a vicinity of the target) in the infrared region of the radiation spectrum. In general, the image may be formed in the infrared spectral range. The image of the target may be projected, as the infrared beam 292, onto the quadrant detector 284, and may be projected on, or generally on, an optical axis of the infrared optical system. In various implementations, the image may be perfectly in-focus, and in some examples may be slightly out-of-focus. Examples of optical systems 282 are described herein below with reference to FIGS. 17a, 17b, and 18a-d.

Quadrant detector 284 may be an infrared sensor, and may correspond to any of the quadrant detectors described herein, according to some implementations. In general, the quadrant detector 284 may receive incident radiation, and may generate electrical signals based on the received incident radiation. Quadrant detector 284 may include micro-bolometers that are sensitive to incident radiation, and the micro-bolometers (or top surfaces of the micro-bolometers) of the quadrant detector may represent a sensitive plane of the quadrant detector. The micro-bolometers of the quadrant detector may be located in a focal plane of the optical system 282, or in a proximity of the focal plane (e.g., for examples where the detector is not in sharp focus) of the optical system 282, for example. The optical system 282 may form an image of a target on the sensitive plane of the quadrant detector 284, for example. In various implementations, the quadrant detector 284 may include several sensitive sections (e.g., quadrants of micro-bolometers, groups of micro-bolometers within a quadrant, individual micro-bolometers or collections of micro-bolometers), and information from the several sensitive sections may be used to determine a position of the incident radiation on the sensitive plane of the quadrant detector.

Electronic unit 286 processes the output signals from the quadrant detector 284. For simplicity, four output signals from the quadrant detector (e.g., one signal from each quadrant of the detector) are depicted in FIG. 14, but in other examples a different number of output signals may be provided from the quadrant detector 284 to the electronic unit 286 (e.g., two signals per quadrant, for a total of eight signals; four signals per quadrant, for a total of sixteen signals; eight signals per quadrant, for a total of thirty-two signals; or any other appropriate number of signals). Electronic unit 286 can generate one or more command output signals based on the information received from the quadrant detector 284. In some implementations, electronic unit 286 provides the one or more command output signals to the set 288 of one or more execution units. In the depicted example of FIG. 14, electronic unit 286 generates four command outputs. In some examples, the electronic unit 286 provides power to the quadrant detector 284 and to the cooler 290. An example of electronic unit 286 will be described in further detail below, with reference to FIG. 15.

The set 288 of one or more execution units includes four execution units 292, 294, 296, 298 in the depicted example of FIG. 14. In general, the execution units may provide responses to the command signals received from the electronic unit 286. Examples of responses that can be provided can include a mechanical positional adjustment of at least a portion of the tracking system (such as positional adjustment of a barrel of a firearm), a switch on or off of an interlock of a striker of the firearm, or an indication of a change in detected indications of a target. For example, a first execution unit 292 may be a positioning element, such as a motor, or a solenoid or electrical magnet used as a positioning element. In various implementations, positioning element 292 may be a linear motor or a rotary motor, or other appropriate type of motor. Positioning element 292 may cause a position change for one or more components of the tracking system 280 based on a received command signal from the electronic unit 286. Similarly, a second positioning element 294 may also be a positioning element, such as a motor, or a solenoid or electrical magnet used as a positioning element. In various implementations, positioning element 294 may be a linear motor or a rotary motor, or other appropriate type of motor. Positioning element 294 may cause a position change for one or more components of the tracking system 280 based on a received command signal from the electronic unit 286. In some examples, first positioning element 292 may be configured to adjust a position in a first direction, and second positioning element 294 may be configured to adjust a position in a second direction that is orthogonal to the first direction. That is, first and second positioning elements 292, 294 may provide two-dimensional positional adjustments to one or more components of the tracking system 280, according to some implementations. In some examples, the electronic unit may generate signals for one or more motors or other positioning elements that cause the motors or other positioning elements to shift, via a one or more positional adjustments, an axis of the firearm towards the source of heat (or towards a colder spot, depending upon settings, for example).

In some examples, a third execution unit 296 may provide an indication of threshold target detection. That is, third execution unit 296 may provide an indication to a user of the tracking system 280 that the system has identified a target. For example, an indication may be provided when it is determined that the system has identified a target having one or more particular thermal properties (e.g., determined to fall within a particular temperature range), or having one or more thermal properties sufficiently different from a thermal property of surrounding objects or areas. Regarding examples of the indication, third execution unit 296 may provide an audible indication (e.g., a tone, a beep, an audible "target detected" message, or the like, perhaps delivered via a headphone or earbud speaker) that a threshold level of radiation has been detected by the sensor 284, based on a command received from the electronic unit 286. Alternatively, third execution unit 296 may provide a visible indication (e.g., a change in a displayed indicator on a sight of the tracking system) that a threshold level of radiation has been detected by the sensor 284, based on a command received from the electronic unit 286. Visible indicators provided by the third execution unit 296 may include a light (e.g., an LED) displayed in an optical portion of the sight, or a pattern-change (e.g., dot changed to cross-hair, dot changed to circle, or cross-hair changed to circle, or other appropriate pattern change). As another alternative, third execution unit 296 may provide a vibration indicator.

In some examples, a fourth execution unit 298 may provide control of an interlock for a striker of a firearm. In various examples, the interlock may provide a safety lock, or may provide an interlock that can lock or release a gun striker. For example, an interlock may be switched (e.g., released) when an object detected, or when an object having one or more particular thermal properties is detected (e.g., determined to fall within a particular temperature range), or having one or more thermal properties sufficiently different from a thermal property of surrounding objects or areas, or when a barrel of a firearm is turned towards a center of the target. In some examples, such as when using a sensor that includes multiple sections or groups and operating as a position sensor, the electronic unit may provide an indication of scope deviation from a heat source. When the deviation is less than a threshold angle, for example, an interlock of a firearm may be released.

Figure 15:
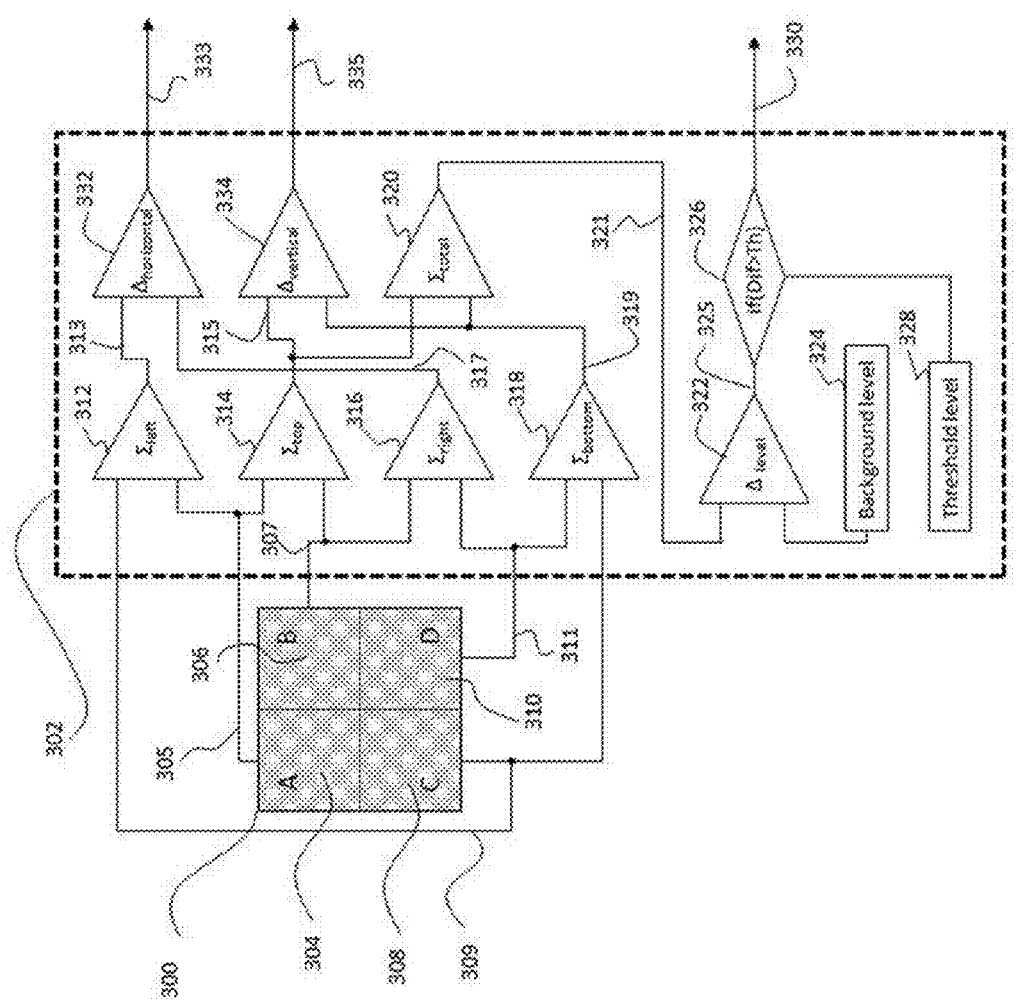
FIG. 15 is a block diagram of an example quadrant detector and an example electronic unit that processes signals from the example quadrant detector.

FIG. 15 is a block diagram of an example quadrant detector 300 and an example electronic unit 302 that processes signals from the example quadrant detector 300. Quadrant detector 300 includes four quadrants: an upper-left quadrant 304, labeled "A," an upper-right quadrant 306, labeled "B," a lower-left quadrant 308, labeled "C" and a lower-right quadrant 310, labeled "D." The upper-left quadrant 304 provides one or more output signals 305 to the example electronic unit 302; the upper-right quadrant 306 provides one or more output signals 307 to the example electronic unit 302; the lower-left quadrant 308 provides one or more output signals 309 to the example electronic unit 302; and the lower-right quadrant 310 provides one or more output signals 311 to the example electronic unit 302. In general, quadrant detector 300 may represent any of the quadrant detectors discussed herein. In operation, an optical system (e.g., an infrared optical system) may direct a beam (e.g., an infrared beam) onto the quadrant detector 300, and the beam may affect the temperature of one or more quadrants of the detector 300. In some examples, each of the quadrants 304, 306, 308, 310 of detector 300 includes two or more groups of micro-bolometers (not shown in FIG. 15), and each of the groups may provide one or more output signals from the respective quadrant of the detector 300 to the electronic unit 302. For simplicity, single output signal lines 305, 307, 309, 311 are depicted from detector 300 to electronic unit 302 in FIG. 15, but in some examples each of the depicted output signal lines may represent multiple signals from a particular quadrant (e.g., one or more signals from each group of the quadrant for quadrants that include multiple groups or micro-bolometers).

Electronic unit 302 may be an analog circuit that includes a variety of analog electrical components, according to various implementations. In some examples, electronic unit 302 does not include an integrated circuit.

Electronic unit 302 acquires as inputs to the electronic unit 302 the output signals 305, 307, 309, and 311 from the quadrant detector 300, and processes the signals 305, 307, 309, and 311. For example, the electronic unit 302 may process signals received from the quadrant detector, and may generate command signals for one or more execution units of a tracking system. In some examples, electronic unit 302 provides power to the quadrant detector 300. For example, electronic unit 302 may provide one or more bias voltages to micro-bolometers of the detector 300 configured in an active mode, and in some cases may provide one or more other power supply voltages to the detector 300.

In some examples, electronic unit 302 may include analog components that can process the signals 305, 307, 309, 311 received from the detector 300. A first summing amplifier 312 takes as inputs the one or more signals 305 from the upper-left quadrant 304 of the detector 300 and the one or more signals 309 from the lower-left quadrant 308 of the detector 300, and generates one or more signals 313 that may represent a sum of the received signals (e.g., A+C) from the upper-left quadrant 304 and the lower-left quadrant 308. As such, signal 313 may represent information associated with the two left quadrants 304, 308 of detector 300. A second summing amplifier 314 takes as inputs the one or more signals 305 from the upper-left quadrant 304 of the detector 300 and the one or more signals 307 from the upper-right quadrant 306 of the detector 300, and generates one or more signals 315 that may represent a sum of the received signals (e.g., A+B) from the upper-left quadrant 304 and the upper-right quadrant 306. As such, signal 315 may represent information associated with the two upper quadrants 304, 306 of detector 300. A third summing amplifier 316 takes as inputs the one or more signals 307 from the upper-right quadrant 306 of the detector 300 and the one or more signals 311 from the lower-right quadrant 310 of the detector 300, and generates one or more signals 317 that may represent a sum of the received signals (e.g., B+D) from the upper-right quadrant 306 and the lower-right quadrant 310. As such, signal 317 may represent information associated with the two right quadrants 306, 310 of detector 300. A fourth summing amplifier 318 takes as inputs the one or more signals 309 from the lower-left quadrant 308 of the detector 300 and the one or more signals 311 from the lower-right quadrant 310 of the detector 300, and generates one or more signals 319 that may represent a sum of the received signals (e.g., C+D) from the lower-left quadrant 308 and the lower-right quadrant 310. As such, signal 319 may represent information associated with the two lower quadrants 308, 310 of detector 300.

A fifth summing amplifier 320 takes as inputs the signals 315 (representing the contributions from the upper quadrants 304, 306) and 319 (representing the contributions from the lower quadrants 308, 310), and generates a summed signal 321 that may represent the signal contributions from each of the four quadrants 304, 306, 308, 310 (e.g., A+B+C+D) of the detector 300. A first differential amplifier 322 subtracts a background level of information 324 from the summed signal 321, and generates a signal 325 that may represent an amount of information detected above background information. A comparator circuit 326 compares signal 325 with a threshold level of information 328, and generates an output signal 330 that may indicate whether or not at least a threshold level of information beyond background information has been detected by the sensor 300. Signal 330 may be provided to an execution unit of a tracking system, for example.

A second differential amplifier 332 subtracts signal 317 (representing the contributions from the two right quadrants 306, 310) from signal 313 (representing the contributions from the two left quadrants 304, 308), and generates a signal 333 that may represent an amount of signal discrepancy between the two left quadrants 304, 308 and the two right quadrants 306, 310. Signal 333 may be provided to an execution unit of a tracking system, for example, such as a positioning element (e.g., a motor that can adjust a position of one or more components of the tracking system in a first direction). For example, signal 333 may be provided to a motor that adjusts a horizontal (e.g., left-to-right) position of one or more components of the tracking system.

A third differential amplifier 334 subtracts signal 319 (representing the contributions from the two lower quadrants 308, 310) from signal 315 (representing the contributions from the two upper quadrants 304, 306), and generates a signal 335 that may represent an amount of signal discrepancy between the two upper quadrants 304, 306 and the two lower quadrants 308, 310. Signal 335 may be provided to an execution unit of a tracking system, for example, such as a positioning element (e.g., a motor that can adjust a position of one or more components of the tracking system in a second direction that is orthogonal to the first direction). For example, signal 335 may be provided to a motor that adjusts a vertical (e.g., up-to-down) position of one or more components of the tracking system.

For ease of illustration and explanation, detector 300 is depicted in FIG. 15 in a classical orientation with horizontal and vertical axes, and signals 333 and 335 are described above as providing information to positional elements that adjust position in a horizontal and vertical direction, respectively. Alternatively, detector 300 may be rotated, for example, 45 degrees clockwise, so that axes of the detector generally form an "X" shape, and signals 333 and 335 may provide information to positional elements that adjust position in a directions aligned with the axes of the rotated detector (e.g., along directions defined by legs of a bipod, as will be discussed in more detail herein below with reference to FIGS. 21-23, for example.

In some examples, a user of a tracking system (e.g., the tracking system 280 of FIG. 14) may manipulate one or more configurable elements (e.g., switches) of the system. For example, one or more aspects of a sensor of the system may be configured, such as configuring to activate a smaller, effective sensor of the overall sensor, to configure an orientation or topology of the sensor, to set a background level (e.g., background level 324 of the electronic unit 302) of the system, or to set a threshold level (e.g., threshold level 328 of electronic unit 302) of the system. The user may perform coarse aiming of the system by aiming the system using a conventional optical sight (e.g., telescopic sight, collimator sight, mechanical sight, night sight). The optical system may collect radiation associated with a target and project an image of the radiation onto a sensor of the system. In some examples, the systems and devices described herein may be useful in foggy, smokey, or dusty conditions, for example to locate a target that may not be visible.

In some examples, the user may configure the tracking system to operate in one or more modes of operation. For example, the system may be configured to operate in a "heat probe" mode to locate (e.g., to search for) a potential target that is warmer or colder than background material in a vicinity of the potential target. The user may be scanning for a camouflaged target, according to some examples. The system may scan for infrared radiation levels in a proximity of an optical axis of a sight, for example, and if a target is detected or if radiation associated with (or of a brightness associated with) an object identified as a target differs from radiation associated with (or a brightness associated with) background by at least a threshold value (e.g., that the user sets or configures), the system may provide an indicator (e.g., an audible indicator, a visual indicator, a tactile indicator) to a user of the system. The sensor may be switched into a "sum signal" mode, and position sensing may be turned off, for example. In some examples, the user may manually aim a firearm in this mode, and may manually release a striker of the firearm (e.g., cause the firearm to discharge) in this mode.

As another example, the system may be configured to operate in a "heat trigger" mode. In addition to using one or more indicators, the system may also use one or more interlocks. For example, if a target is detected or if radiation associated with (or of a brightness associated with) an object identified as a target differs from radiation associated with (or a brightness associated with) background by at least a threshold value (e.g., that the user sets or configures), and if the target is determined to be aligned with a cross hair of the system, the system may provide an indicator (e.g., an audible indicator, a visual indicator, a tactile indicator) to a user of the system and may cause an interlock to release a striker of the firearm (such that shooting is performed automatically in this mode, for example). In some examples, the system may automatically fire even when alignment with a cross hair of the system does not occur. For example, the system may automatically fire when a warm object is detected in a proximity of the cross hair, which in some examples may be an entire area or portion of the area of a smaller effective quadrant detector. This may be useful, for example, during an intense firefight in close quarters, especially when environmental conditions make visibility difficult (e.g., foggy, smoky, dark, etc.)

As yet another example, the system may be configured to operate in a "targeting assistance" mode, where the system may assist a user with fine aiming of a firearm of the system, for example. In this mode, the system may determine a position of an image of the target on the sensor with respect to a center of the sensor, and if the image is off-center with the center of the sensor, may cause one or more positional adjustments to center the image with respect to the center of the sensor. For example, the system may command one or more motors to cause one or more positional adjustments that center the image at the cross hair. One or more indicators may provide an indication to the user when the image is off-center, and may provide another indication to the user when the image is centered. In this mode, for example, a user may perform coarse aiming of the system manually (e.g., to cause the image of the target to be positioned on the sensor, albeit perhaps off-center), and the system may then perform fine aiming to center the target image.

As yet another example, the system may be configured to operate in a "targeting assistance with automatic trigger" mode, where in addition to an indicator that indicates to a user that the target image is centered, the system cause an interlock to release a striker of the firearm (such that shooting is performed automatically in this mode, for example). Coarse aiming may be performed manually in this example, while fine aiming and shooting may be performed automatically.

In general, each of the summing amplifiers 312, 314, 316, 318, 320, and each of the differential amplifiers 322, 332, 334 may include one or more operational amplifiers, and in some examples may also include one or more analog signal conditioning components (e.g., decoupling capacitor, filter capacitor, resistor, inductor, or the like). FIGS. 16A and 16B are schematic diagrams of example input circuits 340, 345, respectively. In some examples, the input circuits 340 or 345 can be included in electronic unit 302. In each of circuits 340 and 345, a micro-bolometer, a group of micro-bolometers, or a quadrant of one or more micro-bolometers is represented generically by a variable resistor 341 in FIGS. 16a and 16b. As described above, a resistance of a micro-bolometer may vary with a temperature of the micro-bolometer (e.g., based on a presence or absence of incident radiation on the micro-bolometer) or a portion of the micro-bolometer, and similarly a resistance of a group or quadrant of micro-bolometers that are electrically connected in any of the combinations described above may vary based on temperatures of the micro-bolometers of the group or quadrant. In general, variable resistor 341 may correspond to any of the micro-bolometers, groups of micro-bolometers, or quadrants of micro-bolometers discussed herein.

With reference first to circuit 340 of FIG. 16a, reference voltage 342 can be provided (e.g., by a power supply of the electronic unit 302), and a voltage across the variable resistor 341 (or a current associated therewith) may serve as an input to an analog component 343 (e.g., an operational amplifier) of the electronic unit 302. A reference resistor 344 is also included in the circuit, for example.

With reference next to circuit 345 of FIG. 16b, reference current 346 can be provided (e.g., by a power supply of the electronic unit 302), and a voltage across the variable resistor 341 and a reference resistor 347 (or a current associated therewith) may serve as an input to an analog component 348 (e.g., an operational amplifier) of the electronic unit 302.

FIG. 17a is side view of an example infrared optical system 350 and an example infrared sensor 352. The infrared optical system 350 includes a concave infrared mirror 354, and a generally flat mirror 356. The concave infrared mirror 354 defines an opening 358 in a center of the concave infrared mirror 354. An optical axis 360 of the infrared optical system 350 may be coaxial with the generally flat mirror 356, the concave mirror 354, the opening 358 in the center of the concave infrared mirror 354, and with the infrared sensor 352. Infrared sensor 352 may represent any of the quadrant detectors described herein, for example.

Optical system 350 is based on reflection optics. For example, for a target located left of the optical system 350, infrared radiation from the target, depicted in FIG. 17a as a first beam 362 and a second beam 364 may be collected by, on incident upon, the concave infrared mirror 354. The concave infrared mirror 354 may reflect the first beam 362 towards the generally flat mirror 356, depicted in FIG. 17a as a first reflected beam 366, and may reflect the second beam 364 towards the generally flat mirror 356, depicted in FIG. 17a as a second reflected beam 368. The generally flat mirror 356 may reflect the first reflected beam 366 through the opening 358 in the concave mirror 354 and onto the infrared sensor 352, depicted in FIG. 17a as first twice-reflected beam 370, and may similarly reflect the second reflected beam 368 through the opening 358 in the concave mirror 354 and onto the infrared sensor 352, depicted in FIG. 17a as second twice-reflected beam 372. The optical system 350 is housed in an enclosure 374. The optical system 350 of FIG. 17a is one example of a reflection-based design, and many variations are possible. For example, in some implementations, the concave mirror does not define an opening. In some examples, the concave infrared mirror may be configured or optimized for 10-micro-range long-wavelength infrared radiation.

Figure 17B:
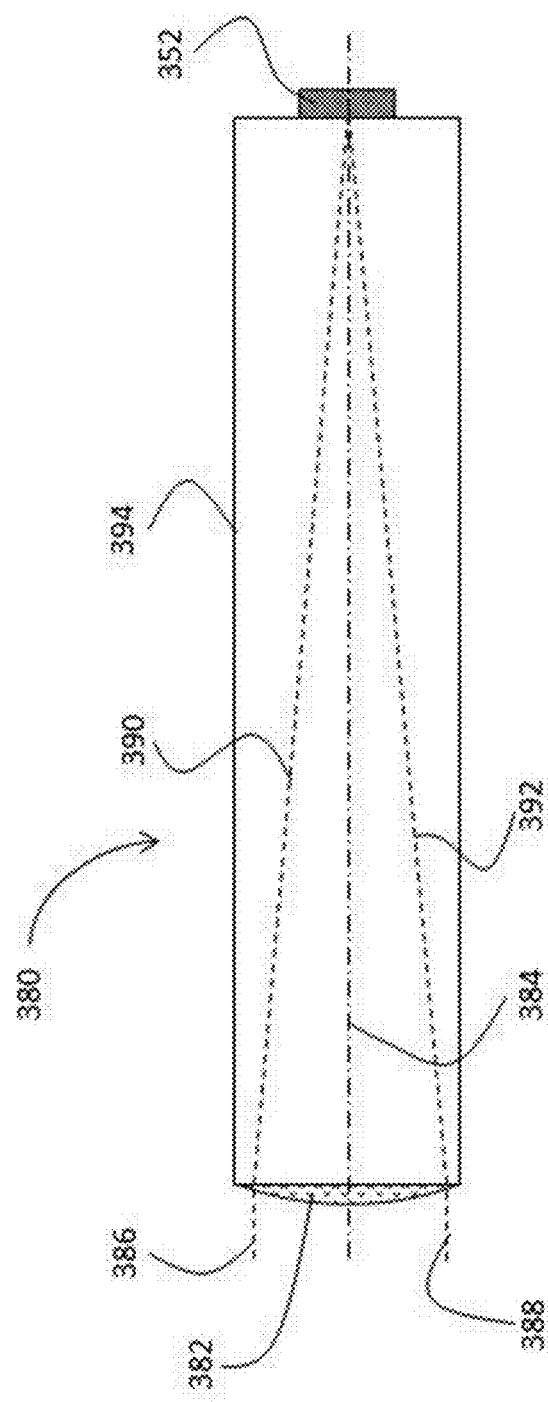
FIG. 17b is a side view of another example infrared optical system and an example infrared sensor.

As an alternative to the reflection-based optical system 350 of FIG. 17a, some optical systems may be based on refraction optics. FIG. 17b is a side view of another example infrared optical system 380, and an example infrared sensor 352. The infrared optical system 380 includes a convex infrared lens 382. An optical axis 384 of the infrared optical system 380 may be coaxial with the convex infrared lens 382, and with the infrared sensor 352. Infrared sensor 352 may represent any of the quadrant detectors described herein, for example. Optical system 380 is based on refraction optics. For example, for a target located left of the optical system 380, infrared radiation from the target, depicted in FIG. 17b as a first beam 386 and a second beam 388 may be collected by, on incident upon, the convex infrared lens 382. The convex infrared lens 382 may refract the first beam 386 towards the infrared sensor 352, as depicted in FIG. 17b by a first refracted beam 390, and may refract the second beam 388 towards the infrared sensor 352, as depicted in FIG. 17b by a second refracted beam 392. In some examples, the convex infrared lens 382 is configured or optimized for 10-micro-range long-wavelength infrared radiation. The optical system 380 is housed in an enclosure 394. The optical system 380 of FIG. 17b is one example of a refraction-based design, and many variations are possible. In some examples, the optical system can use a combination of infrared mirrors and infrared lenses.

Figure 18A:
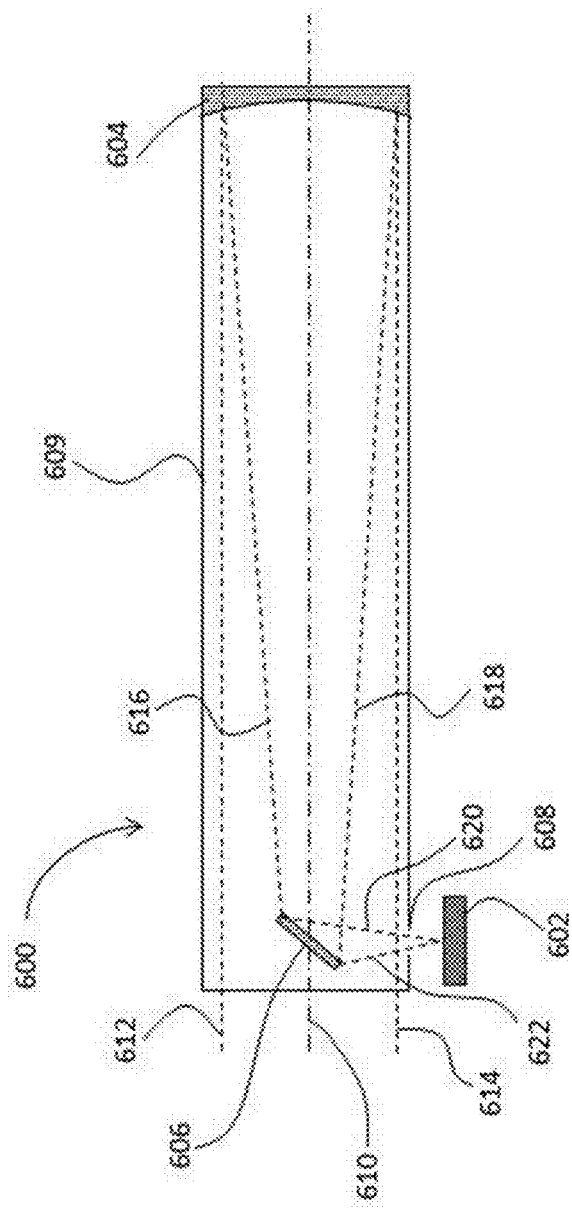
FIG. 18a is a side view of yet another example infrared optical system and an example infrared sensor.

FIG. 18a is side view of another example infrared optical system 600 and an example infrared sensor 602. In the FIG. 18a example, the sensor 602 is located below the optical system rather than behind it, as was the case with the example optical system 350 discussed above with FIG. 17a. The infrared optical system 600 includes a concave infrared mirror 604 and a generally flat mirror 606. The concave infrared mirror 604 does not include an opening in the center of the mirror, in this example. The generally flat mirror 606 is disposed at an angle with respect to vertical (e.g., an angle of about 45 degrees), in this example, and may reflect radiation through an opening 608 on the bottom side of an enclosure 609 of the optical system, onto sensor 602. An optical axis 610 of the infrared optical system 600 may be coaxial with the generally flat mirror 606, and the concave mirror 604, for example. Infrared sensor 602 may represent any of the quadrant detectors described herein, for example.

Optical system 600 is based on reflection optics. For example, for a target located left of the optical system 600, infrared radiation from the target, depicted in FIG. 18a as a first beam 612 and a second beam 614 may be collected by, on incident upon, the concave infrared mirror 604. The concave infrared mirror 604 may reflect the first beam 612 towards the generally flat mirror 606, depicted in FIG. 18a as a first reflected beam 616, and may reflect the second beam 614 towards the generally flat mirror 606, depicted in FIG. 18a as a second reflected beam 618. The generally flat mirror 606 may reflect the first reflected beam 616 through the opening 608 in the enclosure 609 and onto the infrared sensor 602, depicted in FIG. 18a as first twice-reflected beam 620, and may similarly reflect the second reflected beam 618 through the opening 608 and onto the infrared sensor 602, depicted in FIG. 18a as second twice-reflected beam 622. The optical system 600 is housed in the enclosure 609. The optical system 600 of FIG. 18a is one example of a reflection-based design, and many variations are possible. In some examples, the concave infrared mirror may be configured or optimized for 10-micro-range long-wavelength infrared radiation. Mirror 606 is angled to reflect radiation through the opening 608 in a lower surface of the enclosure 609, but in other examples mirror 606 could be angled to reflect radiation through an opening in an upper surface, left surface, or right surface of the enclosure 609, and the sensor 602 could correspondingly be positioned above, left-of, or right-of, respectively, the optical system enclosure, according to various examples.

Figure 18C:
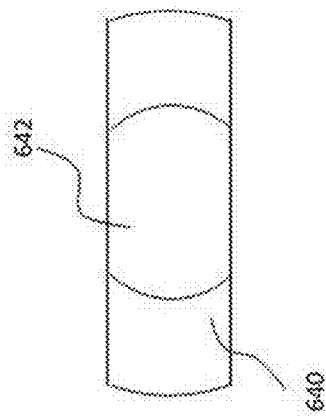
FIGS. 18b, 18c, and 18d are front views of example mirror configurations for an example optical system.
Figure 18D:
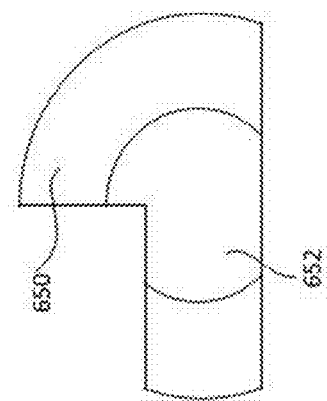
Figure 18B:
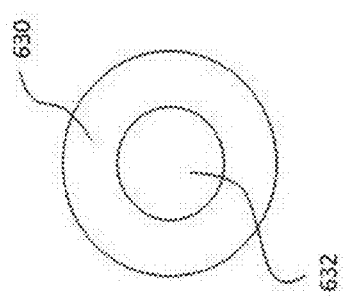

FIGS. 18b, 18c, and 18d are front views of example mirror configurations for an example optical system. FIG. 18b is a front view of a first mirror 630 and a second mirror 632, for example as viewed from the front of an example optical system. The mirrors 630 and 632 of FIG. 18b have a generally round shape. In some examples, the first mirror 630 may correspond to the infrared concave mirror 354 of FIG. 17a, or to the infrared concave mirror 604 of FIG. 18a. In some examples, the second mirror 632 may correspond to the example generally flat mirror 356 of FIG. 17a, or to the generally flat mirror 606 of FIG. 18a.

FIG. 18c is a front view of a first mirror 640 and a second mirror 642, for example as viewed from the front of an example optical system. The mirrors 640 and 642 of FIG. 18c have a generally rectangular shape (e.g., with two rounded edges). In some examples, the mirrors 640 and 642 may correspond to mirrors 630 and 632 of FIG. 18b, but with upper and lower portions of the mirrors 630, 632 cut away. In some examples, the first mirror 640 may correspond to the infrared concave mirror 354 of FIG. 17a, or to the infrared concave mirror 604 of FIG. 18a. In some examples, the second mirror 642 may correspond to the example generally flat mirror 356 of FIG. 17a, or to the generally flat mirror 606 of FIG. 18a. In some examples, mirrors 640 and 642 may occupy less space compared to mirrors 630 and 632, and may be easier to mount into an optical system or tracking system because they occupy less space, for example.

FIG. 18d is a front view of a first mirror 650 and a second mirror 652, for example as viewed from the front of an example optical system. The mirrors 650 and 652 of FIG. 18c have a generally "L" shape, for example. In some examples, the mirrors 650 and 652 may correspond to mirrors 630 and 632 of FIG. 18b, but with upper-left portions of the mirrors 630, 632 cut away. In some examples, the first mirror 640 may correspond to the infrared concave mirror 354 of FIG. 17a, or to the infrared concave mirror 604 of FIG. 18a. In some examples, the second mirror 642 may correspond to the example generally flat mirror 356 of FIG. 17a, or to the generally flat mirror 606 of FIG. 18a. In some examples, mirrors 650 and 652 may occupy less space compared to mirrors 630 and 632, and may be easier to mount into an optical system or tracking system because they occupy less space, for example. Also, in some examples the mirrors 650, 652 and the corresponding optical system may be mounted so that a gun barrel of a system may pass through the cutout area from the mirrors 650, 652. In other examples, one or more mirrors of an optical system may have a generally "U" shape (not shown), or any other appropriate shape.

In some examples, one or more Fresnel lenses or Fresnel mirrors may be used with an example optical system. For example, one or more Fresnel mirrors may replace one or more of the mirrors discussed above with reference to the various example optical systems. Also, for example, one or more Fresnel lenses may replace one or more of the lenses discussed above with reference to the various example optical systems. In general, the one or more Fresnel mirrors or one or more Fresnel lenses may have the generally round shape of the mirrors 630, 632 of FIG. 18b, or the generally rectangular (with curved edges) shape of the mirrors 640, 642 of FIG. 18c, or the generally "L" shape of the mirrors 650, 652 of FIG. 18d, or other appropriate shape (e.g., a "U" shape) according to some implementations.

FIG. 19 is a side view of an example hybrid sight 400 that includes an example infrared sensor 402, an example infrared optical system 404, and an example telescopic sight 406. Infrared sensor 402 may correspond to any of the quadrant detectors described herein, and optical system 404 may correspond to any of the optical systems described herein. Telescopic sight 406 may be a conventional telescopic sight that uses visible or near-infrared light for aiming. A user may use the telescopic sight 406 for target identification, and for coarse aiming, according to some implementations. In some examples, the infrared optical system 404 may be arranged such that an optical axis 408 of the infrared optical system 404 is generally parallel to an optical axis 410 of the telescopic sight 406. In some examples, the axes 408, 410 of the optical system 404 and sight 406 may not be substantially parallel (e.g., based on a compensation adjustment by a mechanical or electronic component of the tracking system), for example when a slight deviation from parallel is desired. In some examples, infrared sensor 402 is attached to the infrared optical system 404 in a vicinity of a focal plane of the infrared optical system 404. In some examples, the infrared sensor 402 and the infrared optical system 404 are arranged so that the optical axis 408 of the infrared optical system 404 passes generally through a center of the infrared sensor 402.

FIG. 20 is a side view of an example hybrid sight 420 that includes an example infrared sensor 402, an example infrared optical system 404, and an example collimator sight 422 (e.g., a "red dot" sight). Infrared sensor 402 may correspond to any of the quadrant detectors described herein, and optical system 404 may correspond to any of the optical systems described herein. Collimator sight 422 may be a conventional red dot sight that uses visible or near-infrared light for aiming. A user may use the collimator sight 422 for target identification, and for coarse aiming, according to some implementations. In some examples, the infrared optical system 404 may be arranged such that an optical axis 408 of the infrared optical system 404 is generally parallel to an optical axis 424 of the collimator sight 422. In some examples, the axes 408, 424 of the optical system 404 and sight 422 may not be substantially parallel (e.g., based on a compensation adjustment by a mechanical or electronic component of the tracking system), for example when a slight deviation from parallel is desired. In some examples, infrared sensor 402 is attached to the infrared optical system 404 in a vicinity of a focal plane of the infrared optical system 404. In some examples, the infrared sensor 402 and the infrared optical system 404 are arranged so that the optical axis 408 of the infrared optical system 404 passes generally through a center of the infrared sensor 402.

While the hybrid sight 400 of FIG. 19 used a telescopic sight 406, and the hybrid sight 420 of FIG. 20 used a collimator sight 422, other example hybrid sights may use a mechanical sight, for example, or a night sight sensitive to visible radiation or near-infrared radiation.

FIG. 21 is a perspective view of an example tracking system 500. The example tracking system includes a bipod 502, which in some examples may be an active bipod that includes a first positioning element 504 and a second positioning element 506. The tracking system also includes an example optical system 508, an example sensor 510, an example optical sight 512, and an example barrel 514, which may be a barrel of a firearm, for example.

The example bipod 502 includes a first leg 516 of the bipod and a second leg 518 of the bipod 502. In some examples, the first leg 516 and the second leg 518 may be substantially orthogonal or perpendicular with one another. In some examples, a first axis of the sensor 510 is aligned with the first leg 516 of the bipod (e.g., the first axis of the sensor may be aligned to be parallel with the first leg 516 or with an axis of the leg defined by opposite ends of the leg), and a second axis of the sensor 510 is aligned with the second leg 518 of the bipod (e.g., the second axis of the sensor may be aligned to be parallel with the second leg 518 or with an axis of the leg defined by opposite ends of the leg). In some examples, the first leg 516 of the bipod 502 may extend from a component of the tracking system (e.g., from optical system 508) at an angle of about negative 45 degrees from a vertical plane passing through a center of the tracking system. In some examples, the second leg 518 of the bipod 502 may extend from a component of the tracking system (e.g., from optical system 508) at an angle of about 45 degrees from a vertical plane passing through a center of the tracking system. Each of the first leg 516 and the second leg 518 includes a base of the bipod, which may be rested on a surface to provide stability for the bipod 502, for example.

The first positioning element 504 may be configured to adjust a distance between a first end 520 of the first leg 516 of the bipod 502 and a second end 522, opposite the first end 520, of the first leg 516 of the bipod 502. Similarly, the second positioning element 506 may be configured to adjust a distance between a first end 524 of the second leg 518 of the bipod 502 and a second end 526, opposite the first end 524, of the second leg 518 of the bipod 502. For example, the first positioning element 504 and the second positioning element 506 may cause one or more positional adjustments based on one or more command signals received from an electronic unit (e.g., any of the electronic units discussed herein, including electronic units 286 and 302) of the tracking system. In this manner, the system may perform fine aiming, for example by causing one or more positional adjustments to center an image of the target at the center of the sensor or at the center of a cross hair, for example to "lock-in" on a target that may previously have been off-center or not at the center of the cross hair. Examples of positioning elements are described below with reference to FIGS. 22a, 22b, and 23a-c.

Optical system 508 may correspond to any of the optical systems discussed herein, including example infrared optical systems 350 and 380 of FIGS. 17 and 18, respectively. Sensor 510 may correspond to any of the sensors or quadrant detectors discussed herein. Optical sight 512 may correspond to any of the optical sights discussed herein, including the telescopic sight 406 of FIG. 19, the collimator sight 422 of FIG. 20, or to a mechanical sight or a night sight, for example, or any other appropriate optical sight.

In the depicted example of FIG. 21, the bipod 502 is attached to the optical system 508. In other examples, the bipod 502 may be attached to the barrel 514 of the firearm, or to another portion of the firearm, or to any other appropriate component of the tracking system 500. In general, the positioning elements 504, 506 of the bipod 502 may react to command signals from an electronic unit and may provide a positional adjustment to the tracking system based on information from the sensor 510. For example, optical system 508 may acquire radiation from a target, and may project a beam of radiation onto the sensor 510. The sensor 510 may provide positional information regarding a position of the beam to an electronic unit. In some examples, the beam provided by the optical system 508 may be off-center at the sensor 510, or not centered about a center of the sensor 510. The sensor 510 may provide information regarding the off-center position of the beam, the electronic unit may process the information from the sensor, and may provide one or more command signals to the first and second positioning elements 504, 506 of the bipod 502 to cause one or more positional adjustments of the system to cause the beam to be centered about the center of the sensor 510.

In some examples, the tracking system may perform fine aiming of the system even when the legs of the bipod are suspended in the air and the bases of the legs are not resting on a surface, for example, as will be discussed in more detail below.

FIG. 22a is a front view of an example positioning element 550 and an example leg 552 of an example bipod. Positioning element 550 may be a linear motor (e.g., a linear stepper motor or other appropriate linear motor), and may be configured to adjust a distance (e.g., increase or decrease the distance) between a first end 554 of the leg 552 and a second end 556 of the leg 552. In the example of FIG. 22a, the positioning element 550 is coaxial with the leg 552, and is disposed near the first end 554 (e.g., near the lower end) of the leg 552. A base 558 of the leg 552 may be rested on a surface to provide stability for the bipod, for example.

FIG. 22b is a front view of an example positioning element 560 and an example leg 562 of an example bipod. Positioning element 560 may be a linear motor (e.g., a linear stepper motor or other appropriate linear motor), and may be configured to adjust a distance (e.g., increase or decrease the distance) between a first end 564 of the leg 562 and a second end 566 of the leg 562. In the example of FIG. 22b, the positioning element 560 is coaxial with the leg 562, and is disposed near the second end 564 (e.g., near the upper end) of the leg 562. A base 558 of the leg 552 may be rested on a surface to provide stability for the bipod, for example.

With either of the example configurations of positioning elements depicted in FIGS. 22a and 22b, a positional adjustment by the system may permit automatic fine aiming of the system to center a target image, for example. In some examples, the fine-tuning may be performed when the bases of the bipod are resting on a surface. In some examples, the fine-tuning may be performed when one or both of the bases of the bipod are not resting on a surface, such as when one or both of the bases are suspended in the air (e.g., if a user is standing without the benefit of a stabilizing surface upon which to rest bases the bipod). This may occur, for example, because of a reactionary force that causes a barrel of the firearm to move in response to an action force of the positional element moving, based on inertia and mass of the positional elements (e.g., motors), for example. For example, as an action force of the motor increases or decreases a distance between a first end and a second end of a leg of the bipod (e.g., lengthen or shorten leg, or an axis of the leg), the barrel of the firearm may be moved in a desirable direction as a reaction force in response to the action force, even when the leg of the bipod is not resting on or pushing against a stabilizing surface. This may benefit a user who is standing or sitting while using the tracking system, for example.

FIG. 22c is a front view of an example positioning element 570 and an example leg 572 of an example bipod. Positioning element 570 may be a rotary motor (e.g., a rotary stepper motor of other appropriate rotary motor), and may be configured to adjust a distance (e.g., increase or decrease the distance) between a first end 574 of the leg 572 and a second end 576 of the leg 572. In the example of FIG. 22c, the positioning element 570 is oriented generally orthogonal with the leg 572. As an illustrative example, the rotary motor 570 is depicted as cooperating with a gear system 578 to adjust a position, but many alternatives are possible. The rotary motor 570 is depicted in FIG. 22c near an upper end of the leg 572, but in other examples the rotary motor 570 may be positioned at other locations along the leg 572 (e.g., near a lower end of the leg, or near the middle of the leg). A base 558 of the leg 572 may be rested on a surface to provide stability for the bipod, for example.

Figure 23B:
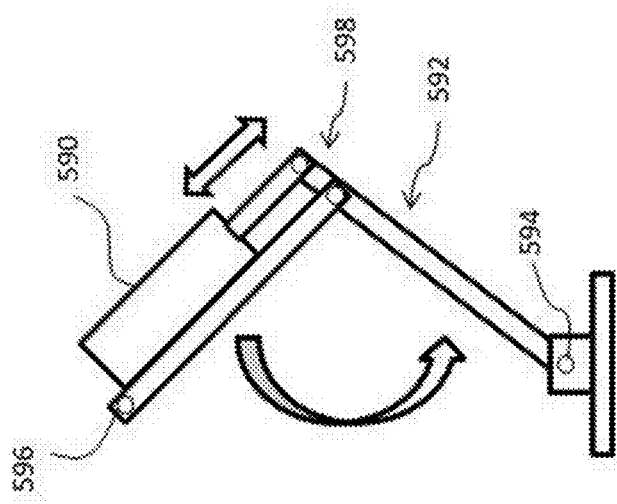
FIG. 23a is a front view and FIG. 23b is a side view, respectively, of yet another example positioning element and an example leg of an example bipod.
Figure 23A:
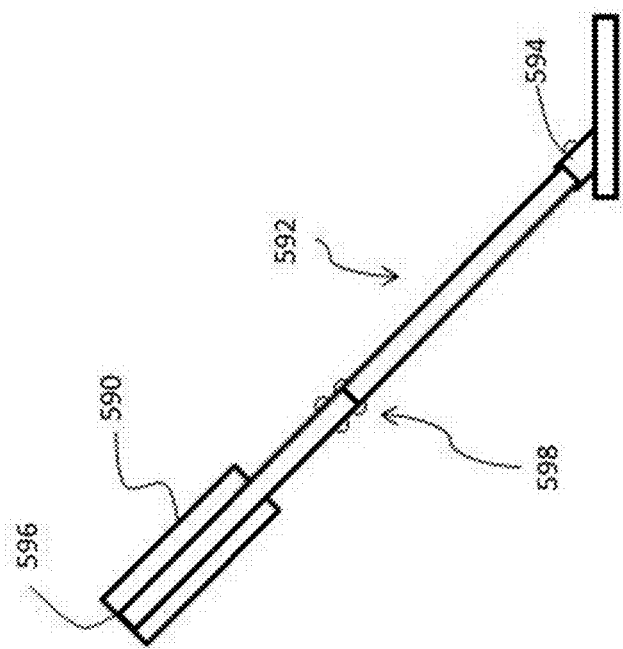

FIG. 23a is a front view and FIG. 23b is a side view, respectively, of yet another example positioning element 590 and an example leg 592 of an example bipod. Positioning element 590 may be configured to adjust a distance (e.g., increase or decrease the distance) between a first end 594 of the leg 592 and a second end 596 of the leg 592. In some examples, positioning element 590 may be a linear motor (e.g., a linear stepper motor or other appropriate linear motor), but in other examples positioning element 590 may be a rotary motor or other appropriate positioning element. The leg 592 includes a joint 598, and a positional adjustment by the positioning element 590 may cause at least a portion of the leg 592 to pivot about the joint 598.

Several examples and implementations have been described herein above, but it is to be understood that the devices and methods described above are not limited in their application to the details of construction or to the arrangements of the components set forth above or illustrated in the drawings. Other embodiments are included within the scope of the description, and may be practiced and carried out in various ways. For example, the thermal sensor applications described above have generally been described to indicate that the system is searching for a target that is warmer than surrounding objects or background objects, or for an object having a particular thermal quality (e.g., a temperature within a particular range, but in some examples the devices and techniques described herein can be used to search for a target that is colder than surrounding objects or background objects. Also, it is to be understood that the phraseology and terminology employed herein are for the purpose of the description and should not be regarded as limiting.

What is claimed is:

1. A thermal position sensing system, comprising:
a thermal position sensor, that includes:
a collection of micro-bolometers, each of the micro-bolometers having an electrical resistance, and each of the micro-bolometers comprising a substrate and an absorptive element, the absorptive element being suspended above the substrate and configured to absorb infrared radiation, including 10-micron long-wavelength infrared radiation, and wherein a change in a temperature of the micro-bolometer caused by infrared radiation incident on the absorptive element causes a change in the resistance of the micro-bolometer;
wherein the collection of micro-bolometers is partitioned into a first quadrant of the sensor, a second quadrant of the sensor, a third quadrant of the sensor, and a fourth quadrant of the sensor, each of the quadrants representing a 90-degree segment of the sensor and comprising at least one micro-bolometer of the collection of micro-bolometers; and
wherein each of the quadrants comprises at least one output signal that provides information indicative of a temperature of the quadrant based on a resistance associated with the at least one micro-bolometer of the quadrant;
an optical element configured to receive infrared radiation and focus the infrared radiation into a beam of infrared radiation on the thermal position sensor; and
an electronic unit configured to receive the at least one output signal from each of the quadrants of the thermal position sensor and determine a position of the beam of infrared radiation on the thermal position sensor relative to the first, second, third and fourth quadrants of the thermal position sensor;

wherein the electronic unit is further configured to determine whether a threshold level of infrared radiation is incident on the thermal position sensor based on the received at least one output signal from each of the quadrants of the thermal position sensor and provide an indication of whether the threshold level of infrared radiation is incident on the thermal position sensor.

2. The thermal position sensor of claim 1, wherein each of the quadrants includes a single micro-bolometer of the collection of micro-bolometers.

3. The thermal position sensor of claim 1, wherein each of the quadrants includes two or more micro-bolometers of the collection of micro-bolometers, the two or more micro-bolometers electrically connected and configured to cooperatively provide an indication of temperature for the respective quadrant based on resistances of the two or more micro-bolometers.

4. The thermal position sensor of claim 1, wherein each of the quadrants includes two or more groups of micro-bolometers, each of the groups including two or more micro-bolometers of the collection of micro-bolometers, the two or more micro-bolometers electrically connected and configured to cooperatively provide an indication of temperature for the respective group based on resistances of the two or more micro-bolometers.

5. The thermal position sensor of claim 1, further comprising a thermoelectric cooler disposed underneath the collection of micro-bolometers and configured to cool the collection of micro-bolometers.

6. A tracking system, comprising:
a thermal position sensor, comprising:
a collection of micro-bolometers, each of the micro-bolometers having an electrical resistance, and each of the micro-bolometers comprising a substrate and an absorptive element, the absorptive element being suspended above the substrate and configured to absorb infrared radiation, including 10-micron long-wavelength infrared radiation, and wherein a change in a temperature of the micro-bolometer caused by infrared radiation incident on the absorptive element causes a change in the resistance of the micro-bolometer;
wherein the collection of micro-bolometers is partitioned into a first quadrant of the sensor, a second quadrant of the sensor, a third quadrant of the sensor, and a fourth quadrant of the sensor, each of the quadrants representing a 90-degree segment of the sensor and comprising at least one micro-bolometer of the collection of micro-bolometers;
and wherein each of the quadrants comprises at least one output signal that provides information indicative of a temperature of the quadrant based on a resistance associated with the at least one micro-bolometer of the quadrant;
an optical element configured to receive infrared radiation and focus the infrared radiation into a beam of infrared radiation on the thermal position sensor;
an electronic unit configured to receive the at least one output signal from each of the quadrants of the thermal position sensor and determine a position of the beam of infrared radiation on the thermal position sensor relative to first, second, third and fourth quadrants of the thermal position sensor, the electronic unit further configured to determine a positional adjustment and provide one or more command signals representing the positional adjustment, wherein the electronic unit is further configured to determine whether a threshold level of infrared radiation is incident on the thermal position sensor based on the received at least one output signal from each of the quadrants of the thermal position sensor, the electronic unit being further configured to provide an indication of whether the threshold level of infrared radiation is incident on the thermal position sensor to a user of the tracking system; and
a positioning element configured to receive the one or more command signals from the electronic unit and positionally adjust one or more components of the tracking system based on the received one or more command signals.

7. The tracking system of claim 6, wherein the positioning element comprises a first motor and a second motor.

8. The tracking system of claim 6 further comprising a firearm to which the tracking system is attached, the firearm including a striker and an interlock for the striker, and wherein the electronic unit is further configured to provide a command signal for controlling the interlock of the striker based on the determination of whether a threshold level of infrared radiation is incident on the thermal position sensor.

9. The tracking system of claim 6, wherein:
each of the quadrants includes two or more groups of micro-bolometers, each of the groups including two or more micro-bolometers of the collection of micro-bolometers, the two or more micro-bolometers electrically connected and configured to cooperatively provide an indication of temperature for the respective group based on resistances of the two or more micro-bolometers; and
wherein the electronic unit includes, for each of the groups, a switch for activating or deactivating the group based on a state of the switch, the electronic unit configured to control the state of the switch.

10. The tracking system of claim 9, wherein the electronic unit is adapted to configure the switches to activate a first subset of the groups and to deactivate a second subset of the groups, the first subset of the groups representing an effective thermal position sensor of reduced size compared to the thermal position sensor.

11. The tracking system of claim 6, further comprising an optical sight, and wherein coarse aiming with the tracking system is performed using the optical sight and fine aiming is performed by the thermal position sensor, the electronic unit, and the positioning element.

12. A tracking system, comprising:
a bipod comprising a first leg and a second leg orthogonal to the first leg, the bipod further comprising a first positioning element and a second positioning element, the first positioning element configured to adjust a distance between a first end of the first leg and a second end of the first leg, and the second positioning element configured to adjust a distance between a first end of the second leg and a second end of the second leg;
a thermal position sensor, comprising:
a collection of micro-bolometers, each of the micro-bolometers having an electrical resistance, and each of the micro-bolometers comprising a substrate and an absorptive element, the absorptive element being suspended above the substrate and configured to absorb infrared radiation, including 10-micron long-wavelength infrared radiation, and wherein a change in a temperature of the micro-bolometer caused by infrared radiation incident on the absorptive element causes a change in the resistance of the micro-bolometer;
wherein the collection of micro-bolometers is partitioned into a first quadrant of the sensor, a second quadrant of the sensor, a third quadrant of the sensor, and a fourth quadrant of the sensor, each of the quadrants representing a 90-degree segment of the sensor and comprising at least one micro-bolometer of the collection of micro-bolometers;

and wherein each of the quadrants comprises at least one output signal that provides information indicative of a temperature of the quadrant based on a resistance associated with the at least one micro-bolometer of the quadrant;

an optical element configured to receive infrared radiation and focus the infrared radiation into a beam of infrared radiation on the thermal position sensor; and electronic unit configured to receive the at least one output signal from each of the quadrants of the thermal position sensor and determine a position of the beam of infrared radiation on the thermal position sensor relative to the first, second, third and fourth quadrants of the thermal position sensor, wherein the electronic unit is further configured to determine whether a threshold level of infrared radiation is incident on the thermal position sensor based on the received at least one output signal from each of the quadrants of the thermal position sensor and provide an indication of whether the threshold level of infrared radiation is incident on the thermal position sensor, and the electronic unit is further configured to determine a positional adjustment and provide a first command signal to the first positioning element and a second command signal to the second positioning element.

13. The tracking system of claim 12, wherein a first axis of the thermal position sensor is aligned with the first leg of the bipod, and a second axis of the thermal position sensor is aligned with the second leg of the bipod.

14. The tracking system of claim 12, wherein the first positioning element is a linear motor and is coaxial with the first leg, and the second positioning element is a linear motor and is coaxial with the second leg.

15. The tracking system of claim 14, wherein the first linear motor is disposed near the first end of the first leg, and the second linear motor is disposed near the first end of the second leg.

16. The tracking system of claim 14, wherein the first linear motor is disposed near the second end of the first leg, and the second linear motor is disposed near the second end of the second leg.

17. The tracking system of claim 12, wherein the first and second positioning elements are rotary motors.

18. The tracking system of claim 12, wherein the first leg includes a first joint, and wherein a positional adjustment by the first positioning element causes at least a portion of the first leg to pivot about the joint.

19. The tracking system of claim 12, wherein the system is configured to automatically perform fine aiming when the first leg and the second leg are in contact with a surface, and wherein the system is also configured to automatically perform fine aiming when one or both of the first leg and the second leg are not in contact with the surface.

* * * * *